(12) United States Patent  (10) Patent No.: US 8,854,356 B2
Oyagi et al.  (45) Date of Patent: Oct. 7, 2014

(54) STORAGE MEDIUM HAVING STORED THEREIN IMAGE PROCESSING PROGRAM, IMAGE PROCESSING APPARATUS, IMAGE PROCESSING SYSTEM, AND IMAGE PROCESSING METHOD

(75) Inventors: Yasuyuki Oyagi, Kyoto (JP); Tatsuya Takadera, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 156 days.

(21) Appl. No.: 12/946,248

(22) Filed: Nov. 15, 2010

(65) Prior Publication Data

US 2012/0075285 A1  Mar. 29, 2012

(30) Foreign Application Priority Data

Sep. 28, 2010  (JP) ................................. 2010-217700

(51) Int. Cl.
*G06T 15/00* (2011.01)
*G09G 5/00* (2006.01)
*G06T 19/00* (2011.01)
*A63F 13/40* (2014.01)
*G06T 7/00* (2006.01)
*G06F 3/01* (2006.01)
*A63F 13/20* (2014.01)

(52) U.S. Cl.
CPC ..... *G06T 19/006* (2013.01); *G06T 2207/10012* (2013.01); *A63F 2300/6676* (2013.01); *A63F 13/10* (2013.01); *A63F 2300/8058* (2013.01); *G06T 7/0042* (2013.01); *G06T 2207/30204* (2013.01); *G06F 3/011* (2013.01); *A63F 2300/1081* (2013.01); *A63F 2300/69* (2013.01); *A63F 13/06* (2013.01)
USPC .......................................... 345/419; 345/633

(58) Field of Classification Search
None
See application file for complete search history.

(56) References Cited

U.S. PATENT DOCUMENTS 5,684,529 A  11/1997  Yoshimi et al.
5,964,830 A  10/1999  Durrett
(Continued)

FOREIGN PATENT DOCUMENTS

EP  1 720 131  11/2006
EP  2 157 545  2/2010
(Continued)

OTHER PUBLICATIONS

Yoon et al., Interactive Training for Synthetic Characters, American Association for Artificial Intelligence (1999).*

(Continued)

*Primary Examiner* — Kee M Tung
*Assistant Examiner* — Frank Chen
(74) *Attorney, Agent, or Firm* — Nixon & Vanderhye, P.C.

(57) ABSTRACT

An image taken by a real camera is repeatedly obtained, and position and orientation information determined in accordance with a position and an orientation of a real camera in a real space is repeatedly calculated. A virtual object or a letter to be additionally displayed on the taken image is set as an additional display object, and based on a result of recognition of a sound inputted into a sound input device, at least one selected from the group consisting of a display position, an orientation, and a display form of the additional display object is set. A combined image repeatedly generated by superimposing on the taken image the set additional display object with reference to a position in the taken image in accordance with the position and orientation information is displayed on a display device.

26 Claims, 17 Drawing Sheets

(56) References Cited

U.S. PATENT DOCUMENTS

| | | | |
|---|---|---|---|
| 6,020,891 A | 2/2000 | Rekimoto | |
| 6,057,833 A | 5/2000 | Heidmann et al. | |
| 6,160,574 A | 12/2000 | Oba et al. | |
| 6,252,624 B1 | 6/2001 | Yuasa et al. | |
| 6,313,864 B1 | 11/2001 | Tabata et al. | |
| 6,325,287 B1 | 12/2001 | Nakajima et al. | |
| 6,342,900 B1 | 1/2002 | Ejima et al. | |
| 6,384,859 B1 | 5/2002 | Matsumoto et al. | |
| 6,474,819 B2 | 11/2002 | Yoder et al. | |
| 6,708,046 B1 | 3/2004 | Takagi | |
| 6,820,056 B1 * | 11/2004 | Harif | 704/275 |
| 6,897,865 B2 | 5/2005 | Higashiyama | |
| 7,321,682 B2 | 1/2008 | Tooyama et al. | |
| 7,371,163 B1 | 5/2008 | Best | |
| 7,374,490 B2 | 5/2008 | Tahara et al. | |
| 7,519,218 B2 | 4/2009 | Takemoto et al. | |
| 7,532,224 B2 | 5/2009 | Bannai | |
| 7,643,025 B2 | 1/2010 | Lange | |
| 8,115,814 B2 | 2/2012 | Iwase et al. | |
| 8,189,038 B2 | 5/2012 | DeCusatis et al. | |
| 8,202,094 B2 * | 6/2012 | Spector | 434/169 |
| 8,305,428 B2 | 11/2012 | Hu | |
| 8,411,931 B2 | 4/2013 | Zhou et al. | |
| 8,418,924 B2 | 4/2013 | Hepworth et al. | |
| 2001/0019946 A1 | 9/2001 | Okuda | |
| 2002/0078291 A1 | 6/2002 | Sutton et al. | |
| 2005/0018045 A1 | 1/2005 | Thomas et al. | |
| 2005/0239521 A1 | 10/2005 | Harada et al. | |
| 2005/0253924 A1 | 11/2005 | Mashitani | |
| 2005/0270368 A1 | 12/2005 | Hashimoto | |
| 2006/0038833 A1 | 2/2006 | Mallinson et al. | |
| 2006/0060463 A1 | 3/2006 | Tokusashi | |
| 2006/0171582 A1 | 8/2006 | Eichhorn | |
| 2006/0203085 A1 | 9/2006 | Tomita | |
| 2006/0244757 A1 | 11/2006 | Fang et al. | |
| 2007/0001003 A1 | 1/2007 | Lee et al. | |
| 2007/0038944 A1 | 2/2007 | Carignano et al. | |
| 2007/0126733 A1 | 6/2007 | Yang et al. | |
| 2007/0236514 A1 | 10/2007 | Agusanto et al. | |
| 2007/0260984 A1 * | 11/2007 | Marks et al. | 715/706 |
| 2007/0273644 A1 | 11/2007 | Mondine Natucci | |
| 2008/0037863 A1 | 2/2008 | Tooyama et al. | |
| 2008/0071559 A1 * | 3/2008 | Arrasvuori | 705/1 |
| 2008/0100620 A1 | 5/2008 | Nagai et al. | |
| 2008/0246757 A1 | 10/2008 | Ito | |
| 2008/0266386 A1 | 10/2008 | Maeda | |
| 2008/0284842 A1 | 11/2008 | Hu | |
| 2009/0033740 A1 | 2/2009 | Ishikawa et al. | |
| 2009/0059497 A1 | 3/2009 | Kuwahara et al. | |
| 2009/0060490 A1 | 3/2009 | Kuwahara et al. | |
| 2009/0070476 A1 | 3/2009 | Brackx et al. | |
| 2009/0224999 A1 | 9/2009 | Kuwahara et al. | |
| 2009/0262108 A1 | 10/2009 | Davidson et al. | |
| 2009/0278764 A1 | 11/2009 | Kuwahara et al. | |
| 2009/0278974 A1 | 11/2009 | Kuwahara et al. | |
| 2009/0285484 A1 | 11/2009 | Mallinson et al. | |
| 2009/0322860 A1 | 12/2009 | Zhang et al. | |
| 2010/0020222 A1 * | 1/2010 | Jones et al. | 348/333.02 |
| 2010/0048290 A1 * | 2/2010 | Baseley et al. | 463/25 |
| 2010/0085423 A1 | 4/2010 | Lange | |
| 2010/0103075 A1 | 4/2010 | Kalaboukis et al. | |
| 2010/0257252 A1 * | 10/2010 | Dougherty et al. | 709/217 |
| 2010/0304857 A1 | 12/2010 | Suzuki et al. | |
| 2010/0316367 A1 | 12/2010 | Kuwahara et al. | |
| 2011/0029903 A1 | 2/2011 | Schooleman et al. | |
| 2011/0034103 A1 * | 2/2011 | Fong et al. | 446/297 |
| 2011/0109720 A1 | 5/2011 | Smolic et al. | |
| 2011/0205341 A1 | 8/2011 | Wilson et al. | |
| 2011/0242361 A1 | 10/2011 | Kuwahara et al. | |

FOREIGN PATENT DOCUMENTS

| | | |
|---|---|---|
| EP | 2 172 252 A2 | 4/2010 |
| EP | 2 187 295 A2 | 5/2010 |
| JP | 06-339155 | 12/1994 |
| JP | 10-51711 | 2/1998 |
| JP | 2000-69404 | 3/2000 |
| JP | 2000-148904 | 5/2000 |
| JP | 2001-165144 | 6/2001 |
| JP | 2001-251396 | 9/2001 |
| JP | 2001-251398 | 9/2001 |
| JP | 2001-251399 | 9/2001 |
| JP | 2002-230586 | 8/2002 |
| JP | D-1160365 | 10/2002 |
| JP | 2004-7214 | 1/2004 |
| JP | 2005-20559 | 1/2005 |
| JP | 2005-151162 | 6/2005 |
| JP | 2005-165776 | 6/2005 |
| JP | 2005-250950 | 9/2005 |
| JP | 2005-286714 | 10/2005 |
| JP | 2006-024175 | 1/2006 |
| JP | 2006-060516 | 3/2006 |
| JP | 2006-72667 | 3/2006 |
| JP | 2006-86099 | 3/2006 |
| JP | 2006-271663 | 10/2006 |
| JP | 2007-12025 | 1/2007 |
| JP | 2008-502206 | 1/2008 |
| JP | 2008-77437 | 4/2008 |
| JP | 2008-510254 | 4/2008 |
| JP | 2008-146109 | 6/2008 |
| JP | 2008-521110 | 6/2008 |
| JP | 2009-025918 | 2/2009 |
| JP | 4260215 | 2/2009 |
| JP | 2009-089435 | 4/2009 |
| JP | 2009-205556 | 9/2009 |
| JP | 2010-170316 | 8/2010 |
| JP | 2010-532120 | 9/2010 |
| JP | 2010-239568 | 10/2010 |
| JP | 2010-244575 | 10/2010 |
| WO | 03/105450 | 12/2003 |
| WO | WO 2009/127701 A1 | 10/2009 |

OTHER PUBLICATIONS

Otsuki et al., Novel Interaction Methods with Mixed Reality Space, The University Electro-Communications (Aug. 20-22, 2008).*

Sep. 20, 2012 Office Action in U.S. Appl. No. 12/862,119, 31 pages.

Kato et al., "An Augmented Reality System and its Calibration based on Marker Tracking", Transactions of the Virtual Reality Society of Japan, vol. 4, No. 4, 1999, pp. 607-616.

Hirokazu Kato, Mark Billinghurst, "Marker Tracking and HMD Calibration for a Video-Based Augmented Reality Conferencing System," iwar, pp. 85, 2nd IEEE and ACM International Workshop on Augmented Reality, 1999, 10 pages.

Report on Nintendo DS Lite Hardwire, Mar. 2, 2006, 5 pages, http://pc.watch.impress.co.jp/docs/2006/0302/nintendo.htm.

U.S. Appl. No. 12/862,119, filed Aug. 24, 2010, Shinji Kitahara et al.

U.S. Appl. No. 13/030,499, filed Feb. 18, 2011, Yui Ehara et al.

U.S. Appl. No. 13/158,824, filed Jun. 13, 2011, Yuichiro Ito.

U.S. Appl. No. 13/158,939, filed Jun. 13, 2011, Yuichiro Ito.

U.S. Appl. No. 13/158,736, filed Jun. 13, 2011, Yuichiro Ito.

U.S. Appl. No. 13/006,039, filed Jan. 13, 2011, Hideki Konno et al.

U.S. Appl. No. 13/243,622, filed Sep. 23, 2011, Yuichiro Ito et al.

Yokoya et al., "Stereo Vision Based Video See-through Mixed Reality" Mixed Reality, Merging Real and Virtual Worlds, Proceedings of International Symposium on Mix Reality, Merging Real and Virtual Worlds, Jan. 1, 1999, pp. 131-145, 15 pages.

Jun. 11, 2012, Notice of Allowance for U.S. Appl. No. 13/006,039, 16 pages.

Report on Nintendo DS Lite Hardware, Mar. 2, 2006, download from the internet, with a partial English translation, 13 pages.

U.S. Appl. No. 12/862,119, filed Aug. 24, 2010, Computer-Readable Storage Medium Having Stored Therein Information Processing Program, Information Processing Apparatus, Information Processing System, and Information Processing Method.

U.S. Appl. No. 13/030,499, filed Feb. 18, 2011, Hand-Held Game Apparatus and Housing Part of the Same.

U.S. Appl. No. 13/158,824, filed Jun. 13, 2011, Computer-Readable Storage Medium, Image Display Apparatus, Image Display System, and Image Display Method.

(56) References Cited

OTHER PUBLICATIONS

U.S. Appl. No. 13/158,939, filed Jun. 13, 2011, Computer-Readable Storage Medium, Image Display Apparatus, Image Display System, and Image Display Method.
U.S. Appl. No. 13/158,736, filed Jun. 13, 2011, Computer-Readable Storage Medium, Image Display Apparatus, Image Display System, and Image Display Method.
U.S. Appl. No. 13/243,622, filed Sep. 23, 2011, Computer-Readable Storage Medium, Information Processing Apparatus, Information Processing System, and Information Processing Method.
U.S. Appl. No. 12/946,248, filed Nov. 15, 2010, Storage Medium Having Stored Therein Image Processing Program, Image Processing Apparatus, Image Processing System, and Image Processing Method.
U.S. Appl. No. 13/746,600, filed Jan. 22, 2013, Image Display System, Image Display Apparatus, and Image Display Method.
Notice of Allowance in U.S. Appl. No. 13/030,499 dated Apr. 15, 2013.
Office Action in U.S. Appl. No. 12/862,119 dated Apr. 25, 2013.
Office Action in U.S. Appl. No. 13/158,736 dated May 23, 2013.
U.S. Appl. No. 13/006,039, filed Jan. 13, 2011, Image Display System, Image Display Apparatus, and Image Display Method.
U.S. Appl. No. 13/243,622, filed Sep. 23, 2011, Computer-Readable Storage Medium, Information Processing Apparatus, Informaton Processing System, and Information Processing Method.
Jul. 11, 2013 Office Action in U.S. Appl. No. 13/158,939.
Watt, Alan, "3D Computer Graphics," Addison Wesley, 3$^{rd}$ Edition, 2000, pp. 1-17.
Japanese Office Action issued in Japanese Patent Application JP 2010-135192 dated Nov. 5, 2013 (with translation).
Notebook Computer [Vaio Note Z] PCG-Z1/P, Japan, Sony Co., Ltd., Mar. 2003, Internet <URL:http://www.vaio.sony.co.jp/Products/Pdf/pcg-zl.pdf>, [searched on Oct. 24, 2013].
Office Action issued in U.S. Appl. No. 13/158,824 dated Oct. 23, 2013.
Office Action issued in U.S. Appl. No. 13/243,622 dated Oct. 25, 2013.
Office Action for U.S. Appl. No. 13/158,939 dated Nov. 8, 2013.
Office Action for U.S. Appl. No. 13/158,736 dated Oct. 28, 2013.
Bookholt, "MacBook Pro 15" Unibody Mid 2010 LCD Replacement, iFixit, Apr. 13, 2010, XP-002722878, url:http/ifixit-guide-pdfs.s3.amazonaws.com/guide_3581_en.pdf, retrieved on Mar. 5, 2014, pp. 20, 22, 24.
MacBook Pro, Wikipedia, Jun. 9, 2010, XP002722879, retrieved on Mar. 5, 2014; URL:http//en.wikipedia.org/w/index.php?title=MacBook_Pro&oldid=366931126.
Chen, "Open Gal", Gizmode, Apr. 20, 2010, XP-002722880,URL:http://gizmodo.com/5520877/open-gal//all, retrieved on Mar. 5, 2014, pp. 1, 2, 4-6.
Liszewski, "Hands-On With The Nintendo DSi", OhGizmol, May 6, 2010, XP-002722881, URL:http://www.ohgizmo.com/2009/05/06/hands-on-with-the-nintendo-dsi/ retried on Mar. 31, 2014, p. 6, Fig. 2.
Nintendo Repair Shop, Inc.: "How to Repair DS Hinge and Shell", You Tube, Mar. 11, 2005 URL:http://www.youtube.com/watch?v=HxHpQTxCeT0 (retrieved on Apr. 1, 2014).
"Nintendo DS", Wikipedia, Jun. 10, 2010, XP-002722882, URL:http://en.wolofedoa.org/w/index.php?titl+Nintendo_DS&oldid=367317982 (retrieved on Apr. 1, 2014), p. 1.
EP 11 15 5148 Extended European Search Report issued Apr. 24, 2014.
Office Action dated May 8, 2014 for U.S. Appl. No. 13/158,824.
Office Action dated May 7, 2014 for U.S. Appl. No. 13/158,939.

* cited by examiner

| SOUND RECOGNITION RESULT | CHARACTER ACTION | ACTION BASIS |
|---|---|---|
| REGISTERED SOUND 1 (SIT DOWN) | SITTING DOWN ACTION | MARKER BASIS |
| REGISTERED SOUND 2 (HAND) | HANDING ACTION | MARKER BASIS |
| REGISTERED SOUND 3 (STAND UP) | STANDING UP ACTION | MARKER BASIS |
| REGISTERED SOUND 4 (NAME) | BARKING ACTION | MARKER BASIS |
| ⋮ | ⋮ | ⋮ |
| CLAPPING | ACTION OF FACING CAMERA ON FOUR LEGS | CAMERA BASIS |
| WHISTLE | ACTION OF HOWLING FACING AT CAMERA | CAMERA BASIS |
| BREATH | ACTION OF HATING BEING BLOWN (FRONT ONLY) | MARKER BASIS |
| ⋮ | ⋮ | ⋮ |

FIG. 21
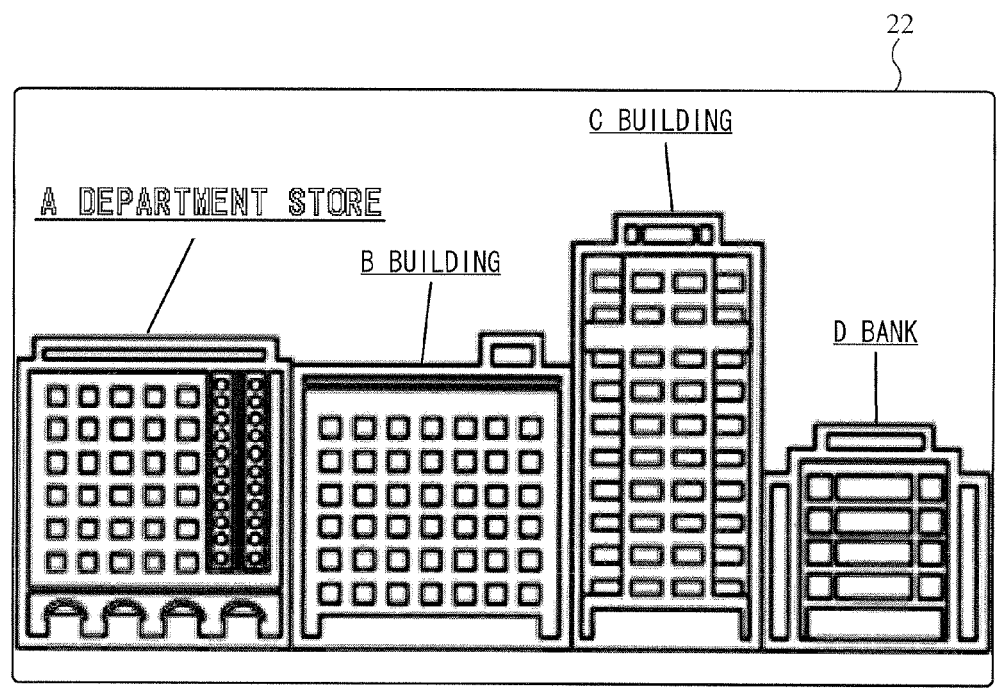
A DEPARTMENT STORE

STORAGE MEDIUM HAVING STORED THEREIN IMAGE PROCESSING PROGRAM, IMAGE PROCESSING APPARATUS, IMAGE PROCESSING SYSTEM, AND IMAGE PROCESSING METHOD

CROSS REFERENCE TO RELATED APPLICATION

The disclosure of Japanese Patent Application No. 2010-217700, filed on Sep. 28, 2010, is incorporated herein by reference.

BACKGROUND OF THE INVENTION

1. Field of the Invention

The present invention relates to a storage medium having stored therein an image processing program, an image processing apparatus, an image processing system, and an image processing method, and more particularly to a storage medium having stored therein an image processing program for displaying an image obtained by combining a real world image with a virtual world image, an image processing apparatus, an image processing system, and an image processing method.

2. Description of the Background Art

Conventionally, in the field of Augmented Reality (AR), which is a technology of additionally displaying in a taken image of a real space various kinds of information such as letters or virtual objects generated by a computer, methods have been studied for determining a reference coordinate system for displaying the virtual objects, as an interactive interface between a real space and the computer. For example, in "An Augmented Reality System and its Calibration based on Marker Tracking" by Hirokazu Kato, Mark Billinghurst, Koichi Asano, and Keihachiro Tachibana, Transactions of the Virtual Reality Society of Japan, Vol. 4, No. 4, 1999, pp. 607-616 (hereinafter referred to as Non-Patent Document 1), a method of calculating, based on the position and the orientation of a marker in an image taken by a camera, a relative position and a relative orientation between the marker and the camera in the real world (see Non-Patent Document 1, for example).

However, in the method described in Non-Patent Document 1, a virtual object or the like additionally displayed in a taken image of the real space can be moved only by moving the viewpoint by moving the camera. Therefore, the user cannot perform operations on the virtual object or the like. Moreover, in order to cause the user's own viewpoint to be directed to the contents of the taken image, the user has to hold or wear an imaging apparatus for taking an image of the real world. In a case where the user performs an input operation by using his/her fingers on the imaging apparatus which the user is holding or wearing, it is difficult for the user to perform such an input operation while taking an image, due to physical restriction. Accordingly, such a conventional input method used in the field of Augmented Reality has a low interactiveness between the real world and the Augmented Reality, and lacks in interest and operability, due to a small variation of contents which can be inputted by the user.

SUMMARY OF THE INVENTION

Therefore, an object of the present invention is to provide a storage medium having stored therein an image processing program which allows a user to perform, when an image obtained by combining a real world image with a virtual world image is displayed, an operation by using a new input method onto a virtual object or a letter additionally displayed on the real world image, an image processing apparatus, an image processing system, and an image processing method.

In order to achieve the above object, the present invention may employ, for example, a configuration described below.

An example of configuration of a computer-readable storage medium having stored therein an image processing program of the present invention causes a computer of an image processing apparatus for displaying an image on a display device to function as taken image obtaining means, position and orientation calculation means, sound data obtaining means, sound recognition means, setting means, image generation means, and display control means. The taken image obtaining means repeatedly obtains an image taken by a real camera. The position and orientation calculation means repeatedly calculates position and orientation information determined in accordance with a position and an orientation of the real camera in a real space. The sound data obtaining means obtains sound data representing a sound signal from a sound input device. The sound recognition means recognizes a sound inputted into the sound input device. The setting means sets one of a virtual object and a letter to be additionally displayed on the taken image, as an additional display object, and sets, based on a sound recognition result by the sound recognition means, at least one selected from the group consisting of a display position, an orientation, and a display form of the additional display object. The image generation means repeatedly generates a combined image by superimposing, with reference to a position in the taken image in accordance with the position and orientation information, the additional display object set by the setting means. The display control means causes the display device to repeatedly display the combined image.

According to the above, when an additional display object is additionally displayed on a taken image, it is possible to perform an operation by means of a sound on the additional display object and to perform a highly simple operation by using the new input method onto the virtual object or letter additionally displayed on the real world image.

Further, the position and orientation calculation means may detect one of a certain imaging target and a certain characteristic point included in the taken image and may calculate, based on a result of the detection, information representing a relative position and a relative orientation between the real camera and the one of the imaging target and the characteristic point, as the position and orientation information.

According to the above, by using the imaging target such as a predetermined marker arranged in the real space or a natural characteristic point, it is possible to accurately recognize the position and the orientation of the real camera in the real space.

Further, the position and orientation calculation means may calculate the position and orientation information by using at least one of a geographic position of the real camera and an azimuth of an imaging direction of the real camera in the real space.

According to the above, by using at least one of the geographic position of the real camera obtained by GPS or the like and the azimuth of the imaging direction of the real camera obtained by means of a magnetic sensor of the like, it is possible to accurately recognize the position and the orientation of the real camera in the real space.

Further, the setting means may set the virtual object as the additional display object. Further, the image generation means may include virtual camera setting means, virtual object arrangement means, and virtual world image generation means. The virtual camera setting means sets in a virtual world a position and an orientation of a virtual camera based on the position and orientation information. The virtual object arrangement means arranges the virtual object set by the setting means in the virtual world. The virtual world image generation means generates as a virtual world image an image in the virtual world seen from the virtual camera. In this case, the image generation means may generate as the combined image an image obtained by superimposing the virtual world image on the taken image.

According to the above, the virtual object in the virtual world seen from the virtual camera which has been set based on the position and orientation information determined in accordance with the position and the orientation of the real camera in the real space, is combined as a virtual world image with the taken image. Therefore, it is possible to display an image in which the virtual object is displayed as if it exists in the real world.

Further, the setting means may set, when the sound inputted into the sound input device is recognized as a first sound and the position and orientation information satisfies a first condition, at least one selected from the group consisting of the display position, the orientation, and the display form of the virtual object based on a first action, and may set, when the sound inputted into the sound input device is recognized as the first sound and the position and orientation information does not satisfy the first condition, at least one selected from the group consisting of the display position, the orientation, and the display form of the virtual object based on a second action.

According to the above, even when the same sound is inputted, the action of the virtual object differs depending on the position and the orientation of the real camera in the real space. Therefore, it is further possible to perform an operation with a high interactiveness between the real world and the Augmented Reality.

The position and orientation calculation means may calculate, as the position and orientation information, information representing a relative position and a relative orientation between the imaging target and the real camera. The setting means may set the virtual object as the additional display object. The image generation means may include virtual camera setting means, virtual object arrangement means, and virtual world image generation means. The virtual camera setting means sets in a virtual world a position and a direction corresponding to the imaging target, based on the position and orientation information, and sets in the virtual world a position and an orientation of the virtual camera, with reference to the position and the direction corresponding to the imaging target, based on the position and orientation information. The virtual object arrangement means arranges the virtual object set by the setting means in the virtual world with reference to the position corresponding to the imaging target. The virtual world image generation means generates as a virtual world image an image of the virtual world seen from the virtual camera. The setting means may set, when the sound inputted into the sound input device is recognized as a first sound, at least one selected from the group consisting of the display position, the orientation, and the display form of the virtual object, based on a first action to be performed with reference to the direction corresponding to the imaging target in the virtual world, and may set, when the sound inputted into the sound input device is recognized as a second sound, at least one selected from the group consisting of the display position, the orientation, and the display form of the virtual object, based on a second action to be performed with reference to the direction to the virtual camera in the virtual world. The image generation means may generate as the combined image an image obtained by superimposing the virtual world image on the taken image.

According to the above, when a different kind of sound is inputted, the virtual object may act with reference to the direction of the imaging target such as the predetermined marker arranged in the real space, and the virtual object may act as if it is acting with reference to the direction to the virtual camera, that is, the direction to the real camera in the real space. Therefore, it is further possible to perform an operation with a high interactiveness between the real world and the Augmented Reality and with much interest.

Further, the setting means may set, at one of a case where the sound is not inputted into the sound input device and a case where the sound recognized by the sound recognition means is not a sound that causes the additional display object to be set, at least one selected from the group consisting of the display position, the orientation, and the display form of the additional display object, to a predetermined content.

According to the above, since the display position, the orientation, and the display form of the additional display object may be automatically changed even when the user does not input a sound, it is possible to display an image in which the additional display object is displayed as if it is acting freely.

Further, the image processing program may cause the computer to function as photograph saving means. The photograph saving means saves in storage means a latest combined image currently generated by the image generation means, in accordance with a photographing instruction given by a user.

According to the above, it is possible to save an image which has been photographed in a state where the additional display object is superimposed on the taken image. Accordingly, it is possible to display the state again.

The taken image obtaining means may repeatedly obtain a first image taken by a first real camera and a second image taken by a second real camera which is provided at a position spaced from the first real camera by a predetermined distance. The position and orientation calculation means may repeatedly calculate first position and orientation information determined in accordance with a position and an orientation of the first real camera in the real space and a second position and orientation information determined in accordance with a position and an orientation of the second real camera in the real space. The image generation means may repeatedly generate a first combined image by superimposing, with reference to a position in the first taken image in accordance with the first position and orientation information, the additional display object set by the setting means, and may repeatedly generate a second combined image by superimposing, with reference to a position in the second taken image in accordance with the second position and orientation information, the additional display object set by the setting means. The display control means may output the first combined image and the second combined image to a display device capable of displaying a stereoscopically visible image, and may cause the display device to repeatedly stereoscopically display the combined image including the additional display object.

According to the above, it is possible to additionally display the additional display object on the taken image, which is stereoscopically displayed on the display device capable of displaying an image in a stereoscopically visible manner.

Further, the sound recognition means may determine whether the sound inputted into the sound input device is a first sound at least by verifying the sound inputted into the sound input device against a sound registered in advance as a registered sound, and may determine whether the sound inputted into the sound input device is a second sound based only on the level of the sound waveform of the sound inputted into the sound input device.

According to the above, it is possible to perform an operation by using a sound (words) uttered as speech sound, which has been verified as a sound registered in advance, or to perform an operation by using a clapping sound which is determined as such based on the level of the waveform of the sound.

The sound recognition means may determine whether the sound inputted into the sound input device is a first sound, based on the likelihood of a feature parameter time series registered in advance as a registered sound against a feature parameter time series obtained from the sound input pattern inputted into the sound input device, and may determine whether the sound inputted into the sound input device is a third sound, based only on at least one of the level of the sound waveform and the spectrum information of the sound inputted into the sound input device.

According to the above, it is possible to perform an operation by means of the sound (words) uttered as a speech sound, by performing sound recognition based on the likelihood of the feature parameter time series registered in advance against the feature parameter time series obtained from the sound input pattern of the inputted sound. It is also possible to perform an operation by means of a clapping sound, a whistle sound, a breath sound, or the like, by performing sound recognition based on at least one of the level of the sound waveform and the spectrum information of the inputted sound.

Further, the image processing program may cause the computer to function as sound registration means. The sound registration means allows a user to input a sound corresponding to an instruction to be given to the additional display object, and registers in a storage means sound data corresponding to the sound as the registered sound corresponding to the instruction. In this case, the sound recognition means may determine whether the sound inputted into the sound input device is the first sound by using the sound data registered as the registered sound by the sound registration means. When the sound recognition means has determined that the sound inputted into the sound input device is the first sound, the setting means may set at least one selected from the group consisting of the display position, the orientation, and the display form of the additional display object, based on the instruction corresponding to the first sound and registered in advance by the sound registration means.

According to the above, the user inputs a sound (words), which is a speech sound corresponding to an instruction, and registers sound data thereof in advance. Accordingly, it is possible to prevent a wrong recognition of the sound, and also possible to register words in advance that the user likes.

The setting means may estimate a subject whose image has been taken in the taken image, based on at least one of the geographic position of the real camera and the azimuth of the imaging direction of the real camera represented by the position and orientation information, and may set a letter which represents information about the subject as the additional display object. The image generation means may repeatedly generate the combined image by superimposing, with reference to a position in the taken image in accordance with the position and orientation information, the letter corresponding to the subject set by the setting means. When a letter which coincides with a word recognized through sound recognition by the sound recognition means is set as the additional display object, the setting means may change a display form into that indicating that the letter has been selected, and may set the letter. The image generation means may generate the combined image by superimposing on the taken image the letter which coincides with the word in the display form updated by the setting means.

According to the above, in a case where an image being taken by the imaging apparatus is being displayed on the display device, when a plurality of pieces of letter information related to the location or the subject (building, signboard, and the like) whose image is being taken by the imaging apparatus are superimposed as additional information to be displayed on the taken image, it is possible to select such letter information by means of a sound. Accordingly, it is possible to provide an input method having a high interactiveness with the Augmented Reality and having a high operability.

Further, the taken image obtaining means may obtain the taken image from the real camera incorporated in a housing which incorporates the image processing apparatus. The sound data obtaining means may obtain the sound data from the sound input device incorporated in the housing. The display control means may cause the display device incorporated in the housing to display the combined image.

According to the above, by incorporating the image processing apparatus, the real camera, the display device, and the sound input device into the same housing, it is possible to realize Augmented Reality in which the user feels as if he or she is looking the real space via the display device, and also to provide the user with an operational feeling as if he or she is giving an instruction by uttering sound into the real space and thus a realistic feeling.

Further, the present invention may be realized as an image processing apparatus and an image processing system, each including the above means, and an image processing method including the above operation steps performed by the above means.

According to the present invention, when an additional display object is additionally displayed on a taken image, it is possible to perform an operation onto the additional display object by means of a sound, and to perform by using the new input method a highly simple operation onto a virtual object, letter, or the like which has been additionally displayed on the real world image.

These and other objects, features, aspects and advantages of the present invention will become more apparent from the following detailed description of the present invention when taken in conjunction with the accompanying drawings.

BRIEF DESCRIPTION OF THE DRAWINGS

FIG. 13 shows an example of sound-action correspondence table data Di in FIG. 12;

FIG. 21 shows an example of letter information being superimposed as additional information on a taken image.

DESCRIPTION OF THE PREFERRED EMBODIMENTS

Figure 1:
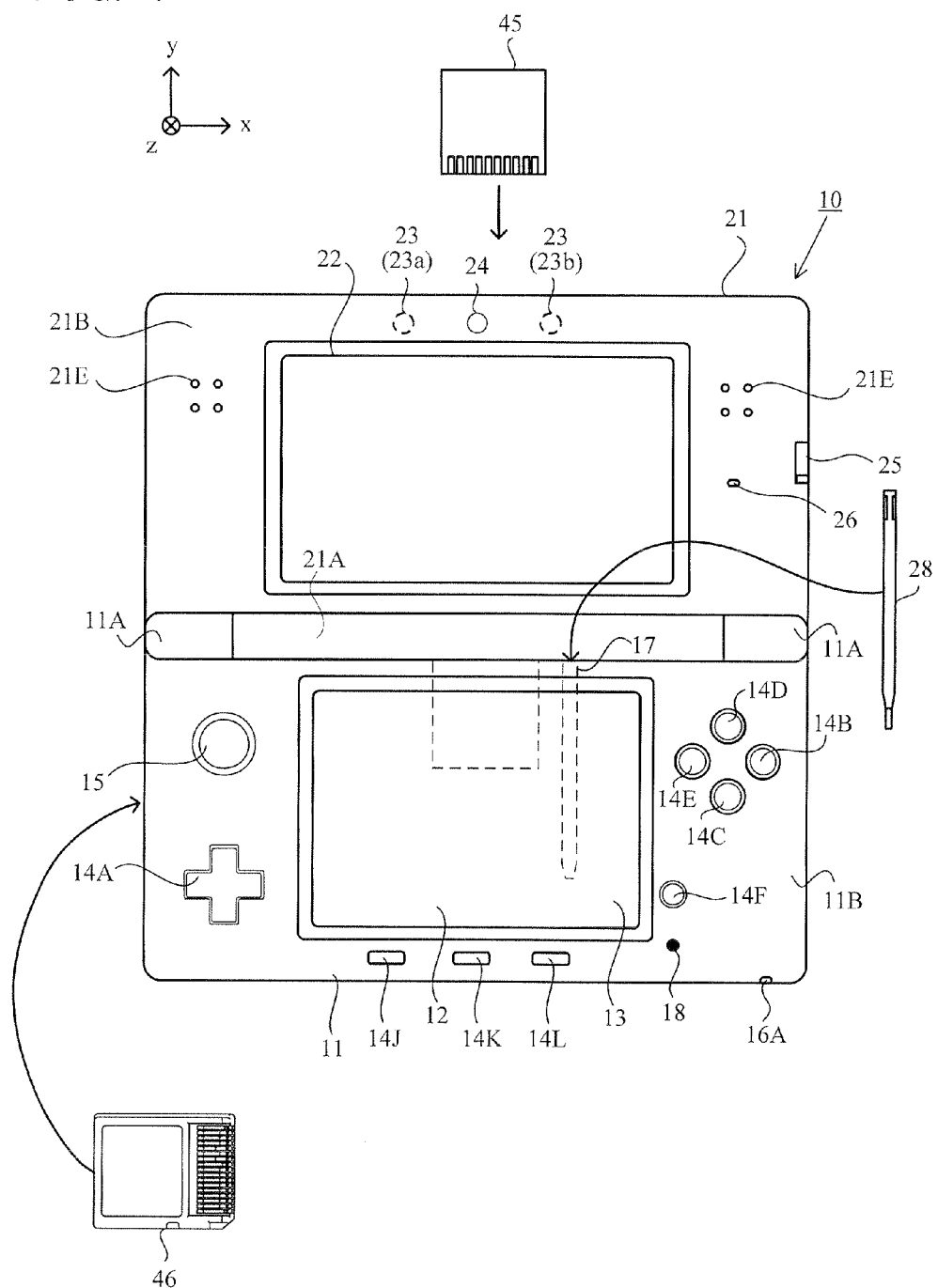
FIG. 1 is a front view showing an example of a game apparatus 10 in an opened state.
Figure 2:
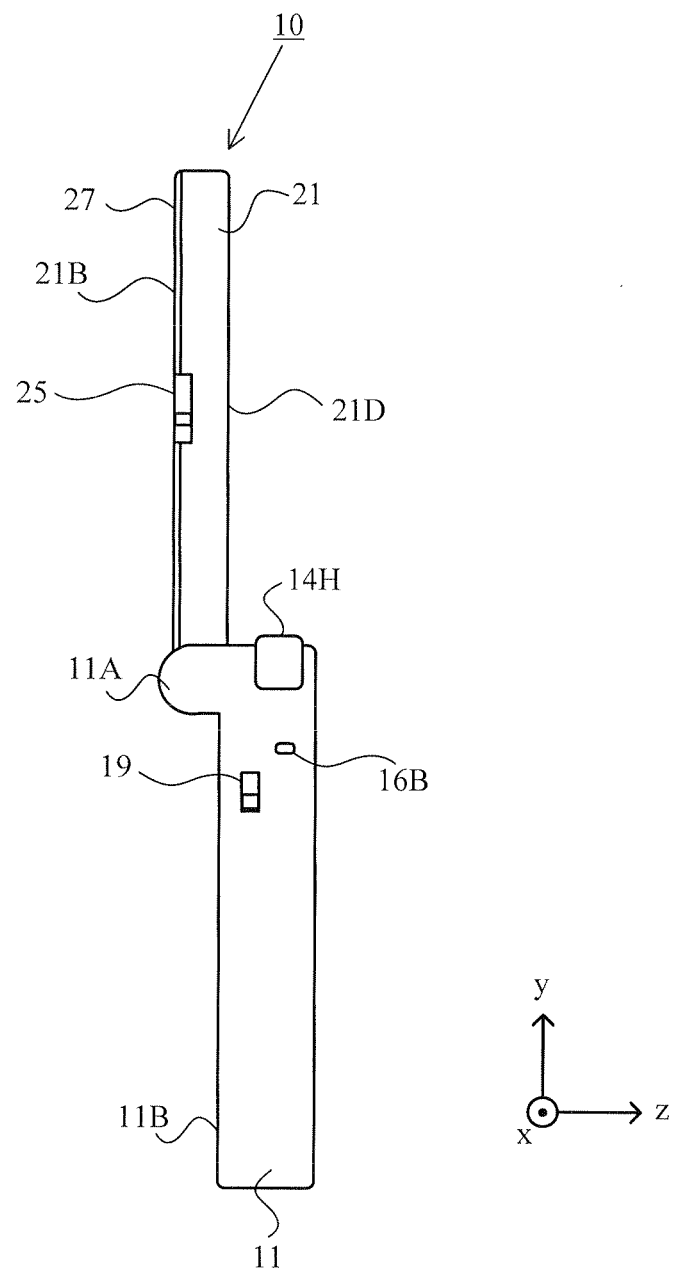
FIG. 2 is a side view showing an example of the game apparatus 10 in the opened state.
Figure 3:
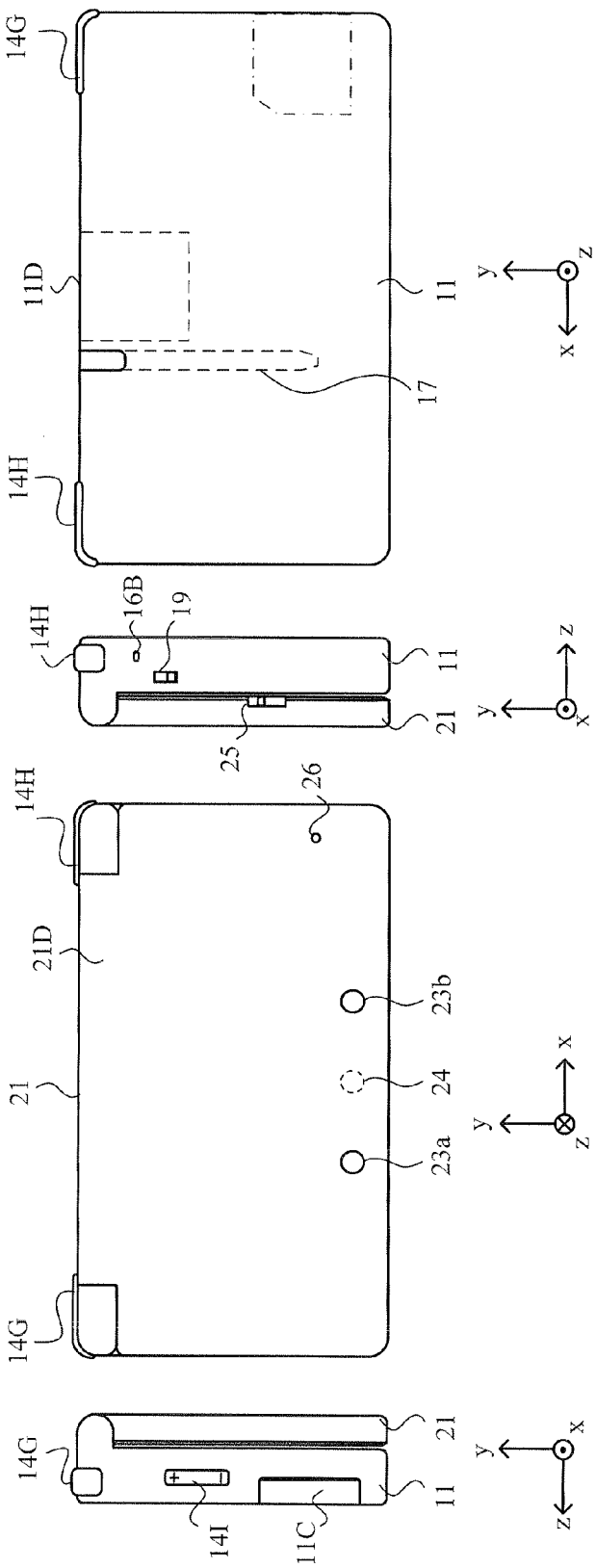
FIG. 3A is a left side view showing an example of the game apparatus 10 in an closed state.
FIG. 3B is a front view showing an example of the game apparatus 10 in the closed state.
FIG. 3C is a right side view showing an example of the game apparatus 10 in the closed state.
FIG. 3D is a rear view showing an example of the game apparatus 10 in the closed state.

With reference to the drawings, an image processing apparatus which executes an image processing program according to an embodiment of the present invention will be described. The image processing program of the present invention can be executed by any computer system, to be practically used. However, in the present embodiment, a hand-held game apparatus 10 is used as an example of an image processing apparatus, and the image processing program is executed by the game apparatus 10. FIG. 1 to FIG. 3D are each a plan view of an example of an outer appearance of a game apparatus 10. The game apparatus 10 is, for example, a hand-held game apparatus, and is configured to be foldable as shown in FIG. 1 to FIG. 3D. FIG. 1 is a front view showing an example of the game apparatus 10 in an opened state. FIG. 2 is a right side view showing an example of the game apparatus 10 in the opened state. FIG. 3A is a left side view showing an example of the game apparatus 10 in a closed state. FIG. 3B is a front view showing an example of the game apparatus 10 in the closed state. FIG. 3C is a right side view showing an example of the game apparatus 10 in the closed state. FIG. 3D is a rear view showing an example of the game apparatus 10 in the closed state. The game apparatus 10 includes an imaging section, and is able to take an image by means of the imaging section, display the taken image on a screen, and store data of the taken image. The game apparatus 10 can execute a game program which is stored in an exchangeable memory card or a game program which is received from a server or another game apparatus, and can display on the screen an image generated by computer graphics processing, such as an virtual space image seen from a virtual camera set in a virtual space, for example.

As shown in FIG. 1 to FIG. 3D, the game apparatus 10 includes a lower housing 11 and an upper housing 21. The lower housing 11 and the upper housing 21 are connected to each other so as to be openable and closable (foldable). In the example of FIG. 1, the lower housing 11 and the upper housing 21 are each formed in a horizontally long plate-like rectangular shape, and are connected to each other at long side portions thereof so as to be pivotable with respect to each other. Usually, the user uses the game apparatus 10 in the opened state. When not using the game apparatus 10, the user keeps the game apparatus 10 in the closed state. In addition to the closed state and the opened state, the game apparatus 10 is capable of maintaining an angle between the lower housing 11 and the upper housing 21 at any angle ranging between the closed state and the opened state by frictional force generated at a connection portion and the like. In other words, the upper housing 21 can be stationary at any angle with respect to the lower housing 11.

As shown in FIG. 1 and FIG. 2, projections 11A each of which projects in a direction orthogonal to an inner side surface (main surface) 11B of the lower housing 11 are provided at the upper long side portion of the lower housing 11, whereas a projection 21A which projects from the lower side surface of the upper housing 21 in a direction orthogonal to the lower side surface of the upper housing 21 is provided at the lower long side portion of the upper housing 21. Since the projections 11A of the lower housing 11 and the projection 21A of the upper housing 21 are connected to each other, the lower housing 11 and the upper housing 21 are foldably connected to each other.

In the lower housing 11, a lower LCD (Liquid Crystal Display) 12, a touch panel 13, operation buttons 14A to 14L (FIG. 1, FIG. 3A to FIG. 3D), an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The lower LCD 12 has a horizontally long shape, and is located such that a long side direction thereof corresponds to a long side direction of the lower housing 11. The lower LCD 12 is positioned at the center of the lower housing 11. The lower LCD 12 is provided on the inner side surface (main surface) of the lower housing 11, and a screen of the lower LCD 12 is exposed at an opening in the inner side surface of the lower housing 11. When the game apparatus 10 is not used, the game apparatus 10 is in the closed state, thereby preventing the screen of the lower LCD 12 from becoming unclean and damaged. The number of pixels of the lower LCD 12 is, as one example, 256 dots×192 dots (the longitudinal line×the vertical line). As another example, the number of pixels of the lower LCD 12 is 320 dots×240 dots (the longitudinal line×the vertical line). The lower LCD 12 is a display device for displaying an image in a planar manner (not in a stereoscopically visible manner), which is different from the upper LCD 22 as described below. Although an LCD is used as a display device in the present embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12 in such a manner as to cover the screen. In the present embodiment, the touch panel 13 may be, but is not limited to, a resistive film type touch panel. A touch panel of any press type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIG. 1 and FIG. 3 D) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14B, button 14C, button 14D, and button 14E are positioned so as to form a cross shape. The button 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction, and is provided to the left of the lower LCD 12 in an upper portion of the inner side surface of the lower housing 11. As shown in FIG. 1, the cross button 14A is provided to the left of the lower LCD 12 in the lower portion of the lower housing 11. That is, the analog stick 15 is provided above the cross button 14A. The analog stick 15 and the cross button 14A are positioned so as to be operated by a thumb of a left hand with which the lower housing 11 is held. Further, the analog stick 15 is provided in the upper portion, and thus the analog stick 15 is positioned such that a thumb of a left hand with which the lower housing 11 is held is naturally positioned on the position of the analog stick 15, and the cross button 14A is positioned such that the thumb of the left hand is positioned on the position of the cross button 14A when the thumb of the left hand is slightly moved downward from the analog stick 15. The analog stick 15 has a top, corresponding to a key, which slides parallel to the inner side surface of the lower housing 11. The analog stick 15 acts in accordance with a program executed by the game apparatus 10. For example, when a game in which a predetermined object appears in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Four buttons, that is, the button 14B, the button 14C, the button 14D, and the button 14E, which are positioned so as to form a cross shape, are positioned such that a thumb of a right hand with which the lower housing 11 is held is naturally positioned on the positions of the four buttons. Further, the four buttons and the analog stick 15 sandwich the lower LCD 12, so as to be bilaterally symmetrical in position with respect to each other. Thus, depending on a game program, for example, a left-handed person can make a direction instruction input by using these four buttons.

Further, the microphone hole 18 is provided on the inner side surface of the lower housing 11. Under the microphone hole 18, a microphone (see FIG. 4) is provided as a sound input device described below, and the microphone detects a sound from the outside of the game apparatus 10.

As shown in FIG. 3 B and FIG. 3 D, an L button 14G and an R button 14H are provided on the upper side surface of the lower housing 11. The L button 14G is positioned on the left end portion of the upper side surface of the lower housing 11 and the R button 14H is positioned on the right end portion of the upper side surface of the lower housing 11. As described below, the L button 14G and the R button 14H act as shutter buttons (photographing instruction buttons) of the imaging section. Further, as shown in FIG. 3 A, a sound volume button 14I is provided on the left side surface of the lower housing 11. The sound volume button 14I is used for adjusting a sound volume of a speaker of the game apparatus 10.

As shown in FIG. 3 A, a cover section 11C is provided on the left side surface of the lower housing 11 so as to be openable and closable. Inside the cover section 11C, a connector (not shown) is provided for electrically connecting the game apparatus 10 to an external data storage memory 46. The external data storage memory 46 is detachably connected to the connector. The external data storage memory 46 is used for, for example, recording (storing) data of an image taken by the game apparatus 10. The connector and the cover section 11C may be provided on the right side surface of the lower housing 11.

Further, as shown in FIG. 3D, an insertion opening 11D through which an external memory 45 having a game program stored therein is inserted is provided on the upper side surface of the lower housing 11. A connector (not shown) for electrically connecting the game apparatus 10 to the external memory 45 in a detachable manner is provided inside the insertion opening 11D. A predetermined game program is executed by connecting the external memory 45 to the game apparatus 10. The connector and the insertion opening 11D may be provided on another side surface (for example, the right side surface) of the lower housing 11.

As shown in FIG. 1, a first LED 16A for notifying a user of an ON/OFF state of a power supply of the game apparatus 10 is provided on the lower side surface of the lower housing 11. As shown in FIG. 3C, a second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established with another device. The game apparatus 10 has a function of connecting to a wireless LAN in a method based on, for example, IEEE802.11.b/g standard. A wireless switch 19 for enabling/disabling the function of the wireless communication is provided on the right side surface of the lower housing 11 (see FIG. 3 C).

A rechargeable battery (not shown) acting as a power supply for the game apparatus 10 is accommodated in the lower housing 11, and the battery can be charged through a terminal provided on a side surface (for example, the upper side surface) of the lower housing 11.

In the upper housing 21, an upper LCD (Liquid Crystal Display) 22, two outer imaging sections 23 (a outer left imaging section 23a and a outer right imaging section 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The upper LCD 22 has a horizontally long shape, and is located such that a long side direction thereof corresponds to a long side direction of the upper housing 21. The upper LCD 22 is positioned at the center of the upper housing 21. The area of a screen of the upper LCD 22 is set so as to be greater than, for example, the area of the screen of the lower LCD 12. Specifically, the screen of the upper LCD 22 is horizontally elongated as compared to the screen of the lower LCD 12. That is, a rate of the horizontal width in the aspect ratio of the screen of the upper LCD 22 is set so as to be greater than a rate of the horizontal width in the aspect ratio of the screen of the lower LCD 12.

The screen of the upper LCD 22 is provided on the inner side surface (main surface) 21B of the upper housing 21, and the screen of the upper LCD 22 is exposed at an opening in the inner side surface of the upper housing 21. Further, as shown in FIG. 2, the inner side surface of the upper housing 21 is covered with a transparent screen cover 27. The screen cover 27 protects the screen of the upper LCD 22, and integrates the upper LCD 22 and the inner side surface of the upper housing 21 with each other, thereby achieving unity. The number of pixels of the upper LCD 22 is, as one example, 640 dots×200 dots (the horizontal line×the vertical line). As another example, the number of pixels of the upper LCD 22 is 800 dots×240 dots (the horizontal line×the vertical line). Although, in the present embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image. The upper LCD 22 can display an image for a left eye and an image for a right eye by using substantially the same display area. Specifically, the upper LCD 22 may be a display device using a method in which the image for a left eye and the image for a right eye are alternately displayed in the horizontal direction in predetermined units (for example, every other line). As an example, when the upper LCD 22 is configured to have a number of pixels of 800 dots in the horizontal direction×240 dots in the vertical direction, a stereoscopical view is realized by assigning to the image 400 pixels in the horizontal direction for a left eye and 400 pixels in the horizontal direction for a right eye such that the pixels of the image for a left eye and the pixels of the image for a right eye are alternately arranged. It should be noted that the upper LCD 22 may be a display device using a method in which the image for a left eye and the image for a right eye are alternately displayed for a predetermined time period. Further, the upper LCD 22 is a display device capable of displaying an image which is stereoscopically visible with naked eyes. In this case, as the upper LCD 22, a lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD 22 of a parallax barrier type is used. The upper LCD 22 displays, by using the image for a right eye and the image for a left eye, an image (a stereoscopic image) which is stereoscopically visible with naked eyes. That is, the upper LCD 22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, the planner manner is a display mode in which the same displayed image is viewed with a left eye and a right eye). Thus, the upper LCD 22 is a display device capable of switching between a stereoscopic display mode for displaying a stereoscopically visible image and a planar display mode for displaying an image in a planar manner (for displaying a planar visible image). The switching of the display mode is performed by the 3D adjustment switch 25 described below.

Two imaging sections (outer left imaging section 23a and outer right imaging section 23b) provided on the outer side surface (the back surface reverse of the main surface on which the upper LCD 22 is provided) 21D of the upper housing 21 are collectively referred to as the outer imaging section 23. The imaging directions of the outer left imaging section 23a and the outer right imaging section 23b are each the same as the outward normal direction of the outer side surface 21D. Further, the outer left imaging section 23a and the outer right imaging section 23b are each designed so as to be positioned in a direction which is opposite to the normal direction of the display surface (inner side surface) of the upper LCD 22 by 180 degrees. Specifically, the imaging direction of the outer left imaging section 23a and the imaging direction of the outer right imaging section 23b are parallel to each other. The outer left imaging section 23a and the outer right imaging section 23b can be used as a stereo camera depending on a program executed by the game apparatus 10. Further, depending on a program, when any one of the two outer imaging sections (outer left imaging section 23a and outer right imaging section 23b) is used alone, the outer imaging section 23 may be used as a non-stereo camera. Further, depending on a program, images taken by the two outer imaging sections (outer left imaging section 23a and outer right imaging section 23b) may be combined with each other or may compensate for each other, thereby enabling imaging using an extended imaging range. In the present embodiment, the outer imaging section 23 is structured so as to include two imaging sections, that is, the outer left imaging section 23a and the outer right imaging section 23b. Each of the outer left imaging section 23a and the outer right imaging section 23b includes an imaging device, such as a CCD image sensor or a CMOS image sensor, having a common predetermined resolution, and a lens. The lens may have a zooming mechanism.

As indicated by dashed lines in FIG. 1 and by solid lines in FIG. 3 B, the outer left imaging section 23a and the outer right imaging section 23b forming the outer imaging section 23 are aligned so as to be parallel to the horizontal direction of the screen of the upper LCD 22. Specifically, the outer left imaging section 23a and the outer right imaging section 23b are positioned such that a straight line connecting the two imaging sections is parallel to the horizontal direction of the screen of the upper LCD 22. Reference numerals 23a and 23b which are indicated as dashed lines in FIG. 1 represent the outer left imaging section 23a and the outer right imaging section 23b, respectively, which are positioned on the outer side surface reverse of the inner side surface of the upper housing 21. As shown in FIG. 1, when a user views the screen of the upper LCD 22 from the front thereof, the outer left imaging section 23a is positioned to the left of the outer right imaging section 23b. When a program for causing the outer imaging section 23 to function as a stereo camera is executed, the outer left imaging section 23a takes an image for a left eye, which is viewed by a left eye of a user, and the outer right imaging section 23b takes an image for a right eye, which is viewed by a right eye of the user. A distance between the outer left imaging section 23a and the outer right imaging section 23b is set so as to be approximately the same as a distance between both eyes of a person, that is, may be set so as to be within a range from 30 mm to 70 mm, for example. However, the distance between the outer left imaging section 23a and the outer right imaging section 23b is not limited to a distance within the range described above.

In the present embodiment, the outer left imaging section 23a and the outer right imaging section 23b are secured to the housing, and the imaging directions thereof cannot be changed.

Further, the outer left imaging section 23a and the outer right imaging section 23b are positioned to the left and to the right, respectively, of the upper LCD 22 (on the left side and the right side, respectively, of the upper housing 21) so as to be horizontally symmetrical with respect to the center of the upper LCD 22. Specifically, the outer left imaging section 23a and the outer right imaging section 23b are positioned so as to be symmetrical with respect to a line which divides the upper LCD 22 into two equal parts, that is, the left part and the right part. Further, the outer left imaging section 23a and the outer right imaging section 23b are positioned at positions which are reverse of positions above the upper edge of the screen of the upper LCD 22 and on the upper portion of the upper housing 21 in an opened state. Specifically, when the upper LCD 22 is projected on the outer side surface of the upper housing 21, the outer left imaging section 23a and the outer right imaging section 23b are positioned, on the outer side surface of the upper housing 21, at a position above the upper edge of the screen of the upper LCD 22 having been projected.

As described above, the two imaging sections (outer left imaging section 23a and outer right imaging section 23b) of the outer imaging section 23 are positioned to the left and the right of the upper LCD 22 so as to be horizontally symmetrical with respect to the center of the upper LCD 22. Therefore, when a user views the upper LCD 22 from the front thereof, the imaging directions of the outer imaging sections 23 can be the same as the direction of the line of sight of the left eye and the direction of the line of sight of the right eye of the user, respectively. Further, the outer imaging section 23 is positioned at a position reverse of a position above the upper edge of the screen of the upper LCD 22. Therefore, the outer imaging section 23 and the upper LCD 22 do not interfere with each other inside the upper housing 21. Therefore, the upper housing 21 may have a reduced thickness as compared to a case where the outer imaging section 23 is positioned on a position reverse of a position of the screen of the upper LCD 22.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

As shown in FIG. 1, when the upper housing 21 is in the opened state, the inner imaging section 24 is positioned, on the upper portion of the upper housing 21, above the upper edge of the screen of the upper LCD 22. Further, in this state, the inner imaging section 24 is positioned at the horizontal center of the upper housing 21 (on a line which separates the upper housing 21 (the screen of the upper LCD 22) into two equal parts, that is, the left part and the right part). Specifically, as shown in FIG. 1 and FIG. 3 B, the inner imaging section 24 is positioned on the inner side surface of the upper housing 21 at a position reverse of the middle position between the outer left imaging section 23a and the outer right imaging section 23b. Specifically, when the outer left imaging section 23a and the outer right imaging section 23b provided on the outer side surface of the upper housing 21 are projected on the inner side surface of the upper housing 21, the inner imaging section 24 is positioned at the middle position between the outer left imaging section 23a and the outer right imaging section 23b having been projected. The dashed line 24 indicated in FIG. 3 B represents the inner imaging section 24 positioned on the inner side surface of the upper housing 21.

As described above, the inner imaging section 24 is used for taking an image in the direction opposite to that of the outer imaging sections 23. The inner imaging section 24 is positioned on the inner side surface of the upper housing 21 at a position reverse of the middle position between the two outer imaging sections 23. Thus, when a user views the upper LCD 22 from the front thereof, the inner imaging section 24 can take an image of a face of the user from the front thereof. Further, the outer left imaging section 23a and the outer right imaging section 23b do not interfere with the inner imaging section 24 inside the upper housing 21, thereby enabling reduction of the thickness of the upper housing 21.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. As shown in FIG. 1 to FIG. 3D, the 3D adjustment switch 25 is provided at the end portions of the inner side surface and the right side surface of the upper housing 21, and is positioned at a position at which the 3D adjustment switch 25 is visible to a user when the user views the upper LCD 22 from the front thereof. The 3D adjustment switch 25 has a slider which is slidable to any position in a predetermined direction (for example, along the longitudinal direction of the right side surface), and a display mode of the upper LCD 22 is determined in accordance with the position of the slider.

For example, when the slider of the 3D adjustment switch 25 is positioned at the lowermost position, the upper LCD 22 is set to the planar display mode, and a planar image is displayed on the screen of the upper LCD 22. The upper LCD 22 may remain set to the stereoscopic display mode, and the same image may be used for the image for a left eye and the image for a right eye, to perform planar display. On the other hand, when the slider is positioned at a position higher than the lowermost position, the upper LCD 22 is set to the stereoscopic display mode. In this case, a stereoscopically visible image is displayed on the screen of the upper LCD 22. When the slider is positioned at a position higher than the lowermost position, a manner in which the stereoscopic image is visible is adjusted in accordance with the position of the slider. Specifically, an amount of displacement in the horizontal direction between a position of an image for a right eye and a position of an image for a left eye is adjusted in accordance with the position of the slider.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled. As shown in FIG. 1, the 3D indicator 26 is positioned near the screen of the upper LCD 22 on the inner side surface of the upper housing 21. Therefore, when a user views the screen of the upper LCD 22 from the front thereof, the user can easily view the 3D indicator 26. Therefore, also when a user is viewing the screen of the upper LCD 22, the user can easily recognize the display mode of the upper LCD 22.

Further, a speaker hole 21E is provided on the inner side surface of the upper housing 21. A sound is outputted through the speaker hole 21E from a speaker 44 described below.

Figure 4:
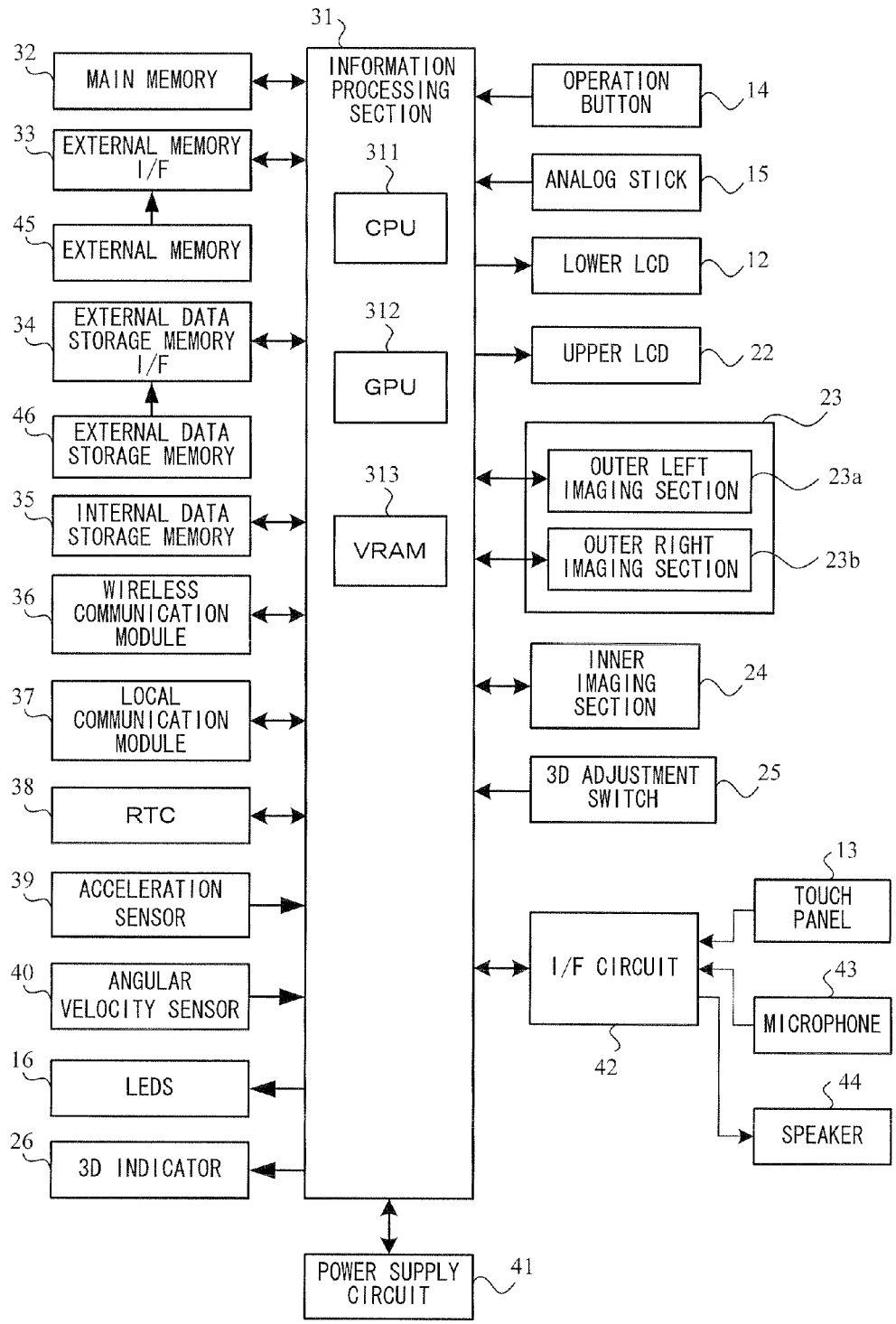
FIG. 4 is a block diagram showing an example of an internal configuration of the game apparatus 10.

Next, an internal configuration of the game apparatus 10 will be described with reference to FIG. 4. FIG. 4 is a block diagram showing an example of an internal configuration of the game apparatus 10.

In FIG. 4, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, an angular velocity sensor 40, a power supply circuit 41, an interface circuit (I/F circuit) 42, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. In the present embodiment, a predetermined program is stored in a memory (for example, the external memory 45 connected to the external memory I/F 33 or the internal data storage memory 35) inside the game apparatus 10. The CPU 311 of the information processing section 31 executes image processing and game processing described below by executing the predetermined program. The program executed by the CPU 311 of the information processing section 31 may be obtained from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 45. The external data storage memory I/F 34 is an interface for detachably connecting to the external data storage memory 46.

The main memory 32 is volatile storage means used as a work area and a buffer area for (the CPU 311 of) the information processing section 31. That is, the main memory 32 temporarily stores various types of data used for the image processing and the game processing, and temporarily stores a program obtained from the outside (the external memory 45, another device, or the like), for example. In the present embodiment, for example, a PSRAM (Pseudo-SRAM) is used as the main memory 32.

The external memory 45 is nonvolatile storage means for storing a program executed by the information processing section 31. The external memory 45 is implemented as, for example, a read-only semiconductor memory. When the external memory 45 is connected to the external memory I/F 33, the information processing section 31 can load a program stored in the external memory 45. A predetermined process is performed by the program loaded by the information processing section 31 being executed. The external data storage memory 46 is implemented as a non-volatile readable and writable memory (for example, a NAND flash memory), and is used for storing predetermined data. For example, images taken by the outer imaging section 23 and/or images taken by another device are stored in the external data storage memory 46. When the external data storage memory 46 is connected to the external data storage memory I/F 34, the information processing section 31 loads an image stored in the external data storage memory 46, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial directions (xyz axial directions in the present embodiment), respectively. The acceleration sensor 39 is provided inside the lower housing 11, for example. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting magnitudes of the linear accelerations generated in the respective axial directions of the game apparatus 10, respectively. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 receives data (acceleration data) representing accelerations detected by the acceleration sensor 39, and calculates an orientation and a motion of the game apparatus 10.

The angular velocity sensor 40 is connected to the information processing section 31. The angular velocity sensor 40 detects angular velocities generated around the three axes (xyz axes in the present embodiment), respectively, of the game apparatus 10, and outputs data representing the detected angular velocities (angular velocity data) to the information processing section 31. The angular velocity sensor 40 is provided in the lower housing 11, for example. The information processing section 31 receives the angular velocity data outputted by the angular velocity sensor 40 and calculates an orientation and a motion of the game apparatus 10.

The RTC 38 and the power supply circuit 41 are connected to the information processing section 31. The RTC 38 counts time, and outputs the time to the information processing section 31. The information processing section 31 calculates a current time (date) based on the time counted by the RTC 38. The power supply circuit 41 controls power from the power supply (the rechargeable battery accommodated in the lower housing 11 as described above) of the game apparatus 10, and supplies power to each component of the game apparatus 10.

The I/F circuit 42 is connected to the information processing section 31. The microphone 43, the speaker 44, and the touch panel 13 are connected to the I/F circuit 42. Specifically, the speaker 44 is connected to the I/F circuit 42 through an amplifier which is not shown. The microphone 43 detects a voice from a user, and outputs a sound signal to the I/F circuit 42. The amplifier amplifies a sound signal outputted from the I/F circuit 42, and a sound is outputted from the speaker 44. The I/F circuit 42 includes a sound control circuit for controlling the microphone 43 and the speaker 44 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents coordinates of a position, on an input surface of the touch panel 13, on which an input is made (touch position). The touch panel control circuit reads a signal outputted from the touch panel 13, and generates the touch position data every predetermined time. The information processing section 31 obtains the touch position data, to recognize a touch position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 obtains the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, for example, the information processing section 31 causes the lower LCD 12 to display an image for input operation, and causes the upper LCD 22 to display an image obtained from one of the outer imaging section 23 or the inner imaging section 24. That is, the information processing section 31 causes the upper LCD 22 to display a stereoscopic image (stereoscopically visible image) using an image for a right eye and an image for a left eye which are taken by the outer imaging section 23, causes the upper LCD 22 to display a planar image taken by the inner imaging section 24, and causes the upper LCD 22 to display a planar image using one of an image for a right eye and an image for a left eye which are taken by the outer imaging section 23, for example.

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye, (taken by the outer imaging section 23), which are stored in the VRAM 313 of the information processing section 31 are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31. In the present embodiment, the information processing section 31 issues an instruction for taking an image to one of the outer imaging section 23 or the inner imaging section 24, and the imaging section which receives the instruction for taking an image takes an image and transmits data of the taken image to the information processing section 31. Specifically, a user selects the imaging section to be used through an operation using the touch panel 13 and the operation buttons 14. When the information processing section 31 (the CPU 311) detects that the imaging section is selected, the information processing section 31 instructs one of the outer imaging section 32 or the inner imaging section 24 to take an image.

The 3D adjustment switch 25 is connected to the information processing section 31. The 3D adjustment switch 25 transmits, to the information processing section 31, an electrical signal in accordance with the position of the slider.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode.

Figure 5:
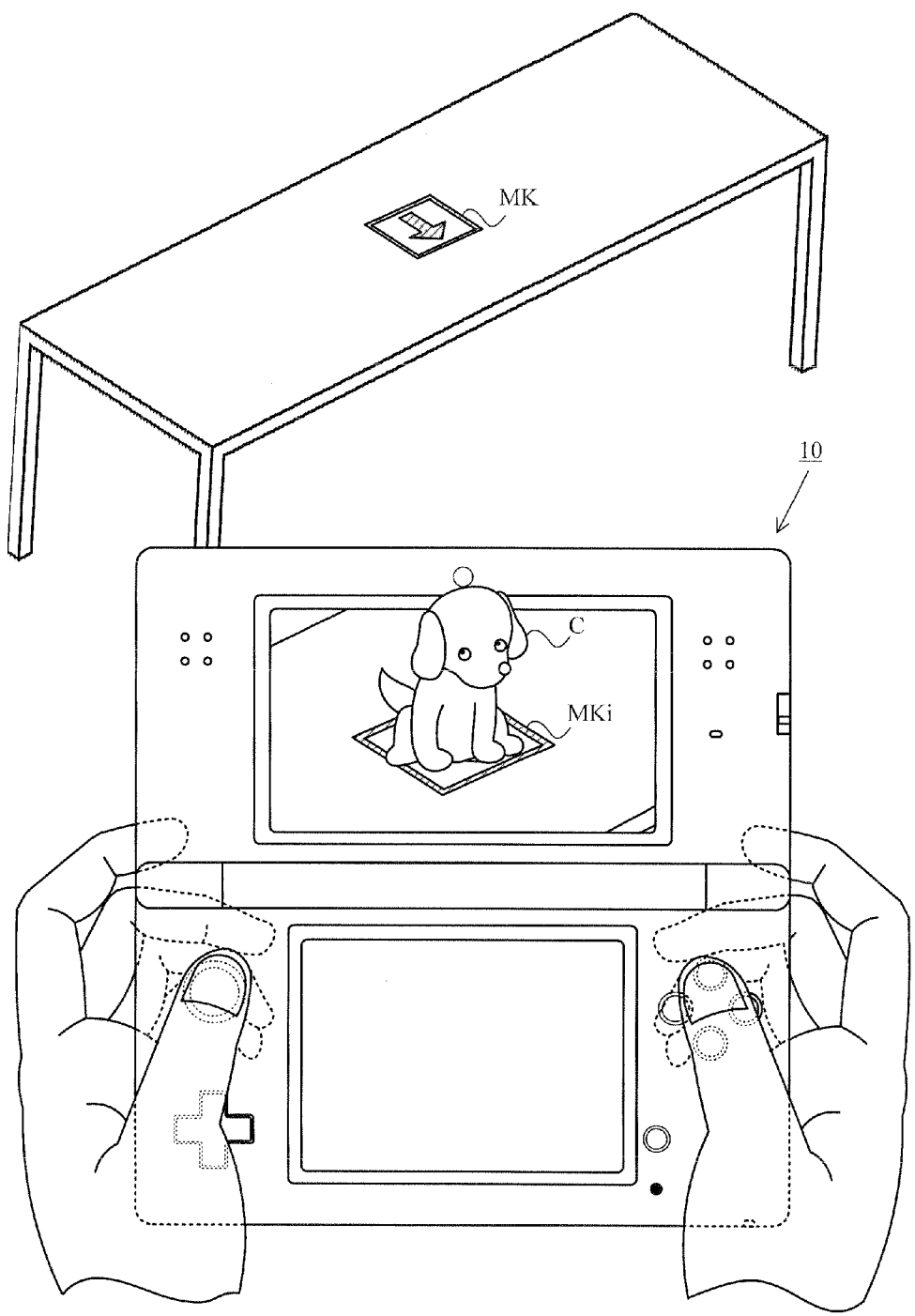
FIG. 5 shows an example of the game apparatus 10 held by the user with both hands.
Figure 6:
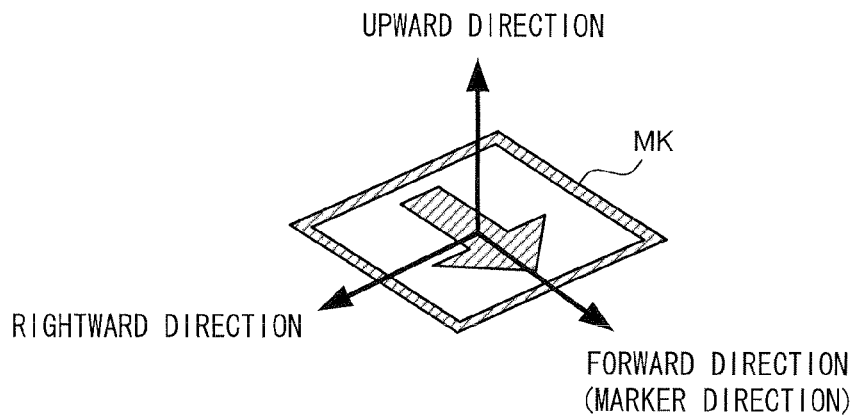
FIG. 6 shows an example of a marker MK whose image is taken by an outer imaging section 23.
Figure 7:
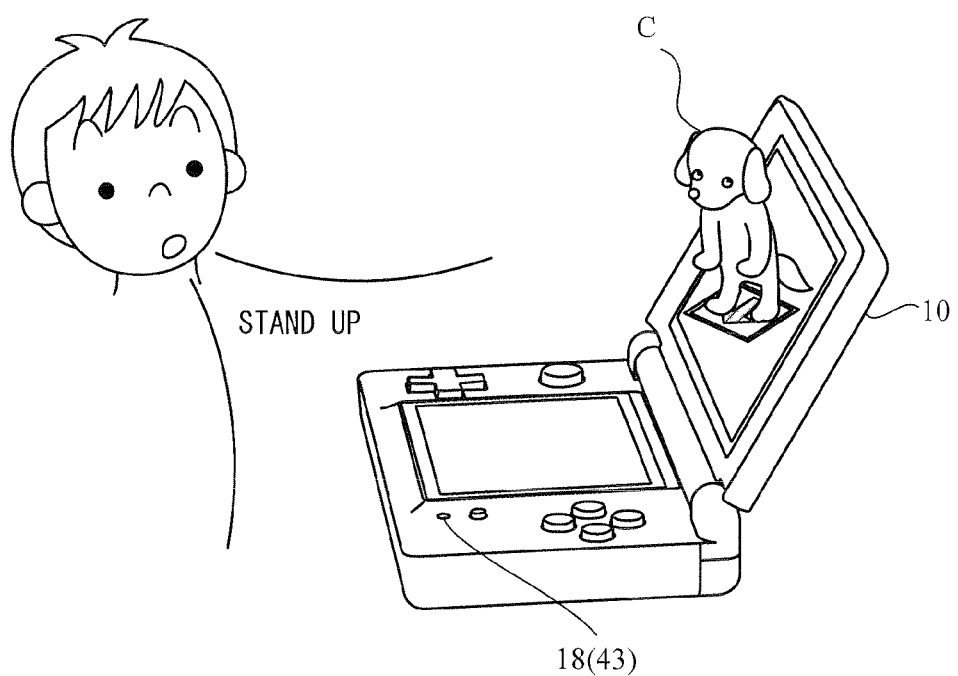
FIG. 7 schematically shows an example illustrating the user inputting a sound into the game apparatus 10.

Next, with reference to FIG. 5 to FIG. 11, description is given of an example of a state in which the game apparatus 10 is used and of display contents to be displayed on the game apparatus 10. FIG. 5 shows an example of the game apparatus 10 held by the user with both hands. FIG. 6 shows an example of a marker MK whose image is taken by the outer imaging section 23. FIG. 7 schematically shows an example illustrating the user inputting a sound into the game apparatus 10. FIG. 8 to FIG. 11 each show an example of a display form displayed on the upper LCD 22.

As shown in FIG. 5, the user holds the side surfaces and the outer side surface (the surface reverse of the inner side surface) of the lower housing 11 with his/her palms, middle fingers, ring fingers, and little fingers of both hands such that the lower LCD 12 and the upper LCD 22 face the user. This allows the user to perform operations onto the operation buttons 14A to 14E and the analog stick 15 by using his/her thumbs, and operations onto the L button 14G and the R button 14H with his/her index fingers, while holding the lower housing 11. In the example shown in FIG. 5, a real world image of a real world on the side of the back surface of the game apparatus 10 taken by the outer left imaging section 23a and the outer right imaging section 23b is stereoscopically displayed on the upper LCD 22.

In the present embodiment, in accordance with the image processing program, a combined image generated by combining an real world image currently being taken by the outer imaging section 23 (outer left imaging section 23a and outer right imaging section 23b) with an image of a virtual object present in a three-dimensional virtual space is displayed on the screen of the upper LCD 22 in a stereoscopically visible manner. Specifically, two images taken by the outer imaging section 23 are supplied to the upper LCD 22 in such a manner as to have a predetermined parallax, to be stereoscopically displayed on the upper LCD 22. On the screen of the upper LCD 22, a subject that is relatively nearer to the outer imaging section 23 is viewed by the user as if the subject is located relatively nearer to the user, and a subject that is relatively farther from the outer imaging section 23 is viewed by the user as if the subject is located relatively farther from the user.

FIG. 5 shows an example of a virtual character C (stereoscopic image), which is a virtual object displayed on the screen of the upper LCD 22 while an image of the marker MK (a real object whose image is taken) is being taken by the outer imaging section 23. As shown in FIG. 5, a square including an exemplary arrow is drawn as an example of the marker MK. The CPU 311 can determine, with respect to a taken image obtained from the outer imaging section 23, whether the taken image includes the marker MK by performing image processing such as pattern matching. When an image of the marker MK has been taken by the outer imaging section 23, the marker MK is displayed on the upper LCD 22 in a stereoscopically visible manner as a real world image, which is a marker image MKi and, at the same time, the virtual character C (for example, a virtual object which looks like a dog) is displayed in a stereoscopically visible manner in combination with the MKi at a position at which the marker image MKi included in the real world image is displayed. FIG. 5 shows the virtual character C extending out of the screen of the upper LCD 22 in order to facilitate understanding. Actually, however, the virtual character C is displayed within the screen. FIG. 7 is drawn in the same manner as FIG. 5. Moreover, FIG. 5 and FIG. 7 each show the subject in such a manner as if it jumps out of the screen. However, the expression "displaying a subject in a stereoscopically visible manner" means not only displaying the subject as if it jumps out of the screen but also displaying the subject with a depth in a direction extending away from the user relative to the screen.

Here, as shown in FIG. 6, the marker MK has definitions of directions (forward direction, rightward direction, and upward direction) and the virtual character C can be arranged in an orientation based on the orientation of the marker MK. For example, the virtual character C can be arranged on the marker image MKi such that the forward direction of the virtual character C corresponds to the forward direction of the marker image MKi. It should be noted that, in the description below, the forward direction of the marker image MKi may be described as a "marker direction".

As shown in FIG. 7, when giving an action instruction to the virtual character C displayed on the game apparatus 10, the user can give such an action instruction by means of a sound. It can be considered that the sound that the user inputs into the game apparatus 10 may be whistle sound, clapping sound, breath sound or the like as well as speech sound (words). However, these sounds are collectively called as "sound" herein.

In order to cause the game apparatus 10 to determine the type of the sound from the user, the user inputs his/her own sound through the microphone 43 (microphone hole 18). The game apparatus 10 obtains sound data representing a sound signal of the sound inputted through the microphone 43 via the I/F circuit 42, analyzes the sound data, and determines the type of the sound inputted through the microphone 43. Then, the game apparatus 10 performs processing in accordance with the result of the determination regarding the sound inputted through the microphone 43, and causes the virtual character C to perform an action in accordance with the result of the determination. As one example, when the game apparatus 10 determines that the sound inputted through the microphone 43 is words (e.g., "stand up") to instruct the virtual character C to perform an action of standing up, the game apparatus 10 causes the virtual character C to perform the action of standing up in accordance with the sound for which the determination has been performed, to be displayed on the upper LCD 22 (the state shown in FIG. 7).

Next, with reference to FIG. 8 to FIG. 11, description is given of another example of the virtual character C to be displayed on the screen of the upper LCD 22 while an image of the marker MK is being taken by the outer imaging section 23.

Figure 8:
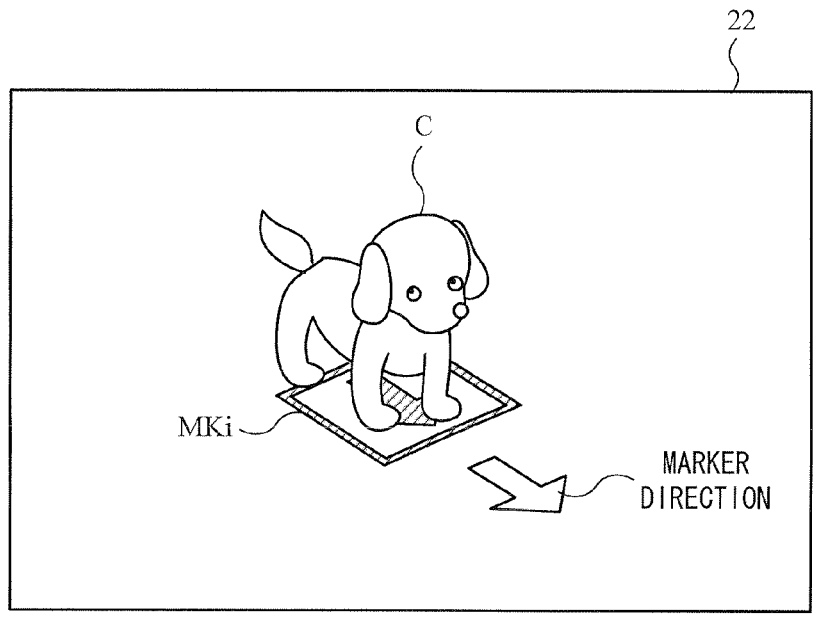
FIG. 8 shows an example of a display form displayed on an upper LCD 22.

In FIG. 8, the virtual character C is being displayed in a "normal state". Here, the "normal state" is a state where the virtual character C is not performing an action designated by an action instruction by the user and is acting in a predetermined manner. For example, in the "normal state", the virtual character C stays still with the four legs on the ground (on the marker image MKi or on the same plane as the marker image MKi) or freely moves around. In the example shown in FIG. 8, a state where the virtual character C is standing with its four legs on the ground in such a manner that the forward direction of the virtual character C coincides with the forward direction of the marker image MKi, is set as the "normal state".

Figure 9:
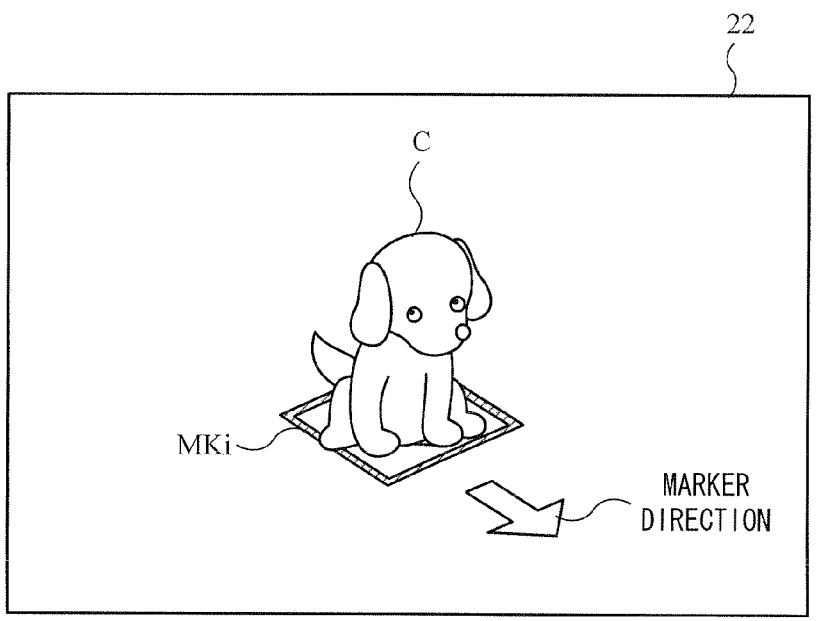
FIG. 9 shows an example of a display form displayed on the upper LCD 22.

FIG. 9 shows an action performed by the virtual character C when words (e.g., "sit down") to instruct the virtual character C to perform an action of sitting down are inputted to the game apparatus 10. As shown in FIG. 9, when the sound to instruct the virtual character C to perform an action of sitting down is inputted to the game apparatus 10, the virtual character C starts the action of sitting down on the ground (on the marker image MKi or on the same plane as the marker image MKi), and sits down on the ground in such a manner that the forward direction of the virtual character C coincides with the forward direction of the marker image MKi. In this manner, when words (e.g., "sit down" or "lie down") representing the name of an action to be performed by the virtual character C are inputted to the game apparatus 10, the virtual character C may perform the action corresponding to the words in such a manner that the forward direction of the virtual character C coincides with the forward direction of the marker image MKi. As another example, when words representing the name of the virtual character C is inputted to the game apparatus 10, the virtual character C may bark in such a manner that the forward direction of the virtual character C coincides with the forward direction of the marker image MKi.

Figure 10:
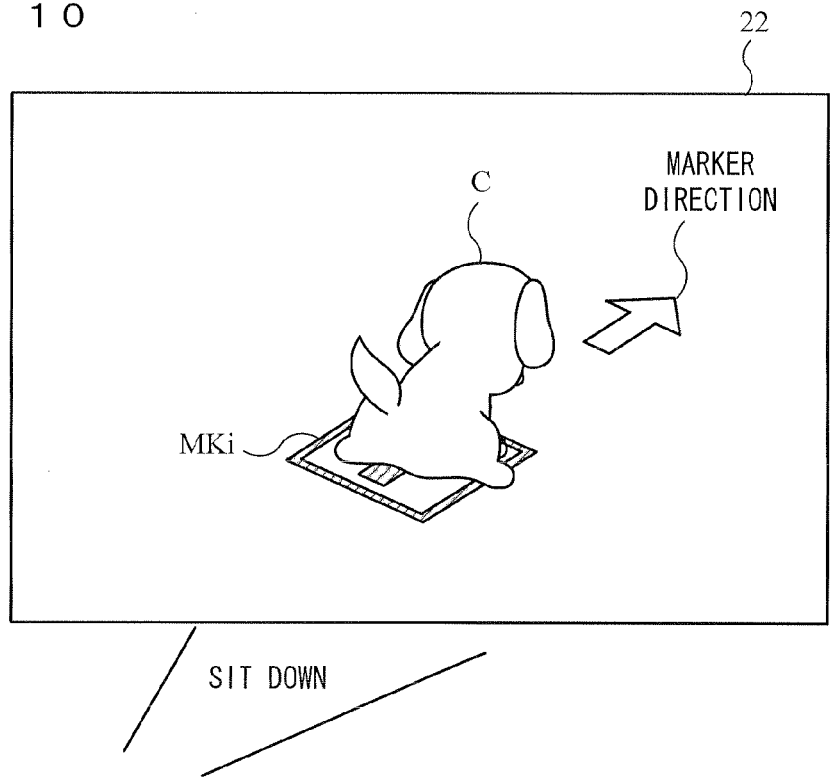
FIG. 10 shows an example of a display form displayed on the upper LCD 22.

For example, it is assumed that the position and the orientation of the marker MK whose image is taken are changed by the user moving the game apparatus 10, that is, the position and the orientation of the marker image MKi displayed on the screen of the upper LCD 22 are changed, as shown in FIG. 10. In this case, the position and the orientation of the virtual character C are changed in such a manner as to follow the change in the taken image. For example, when the marker direction is changed from that in the image where the virtual character C is sitting as shown in FIG. 9, the virtual character C continues to sit on the marker image MKi with the orientation of the virtual character C changed so as to follow the change of the marker direction (state shown in FIG. 10). Accordingly, the user sees the virtual character C as if it exists in the real world.

Figure 11:
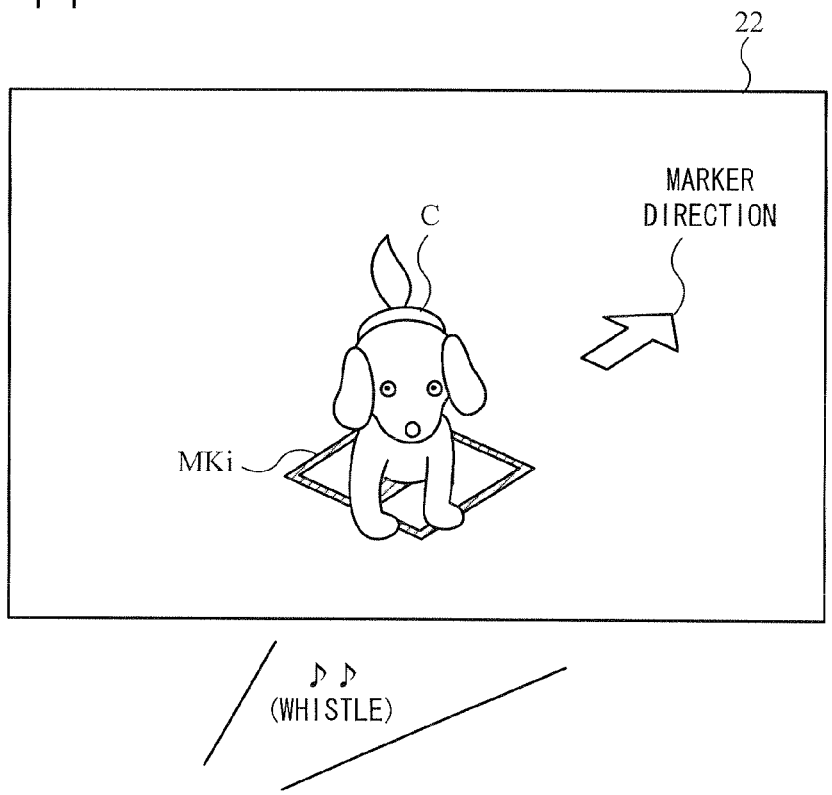
FIG. 11 shows an example of a display form displayed on the upper LCD 22.

Meanwhile, in the present embodiment, in accordance with an action instruction by means of a sound which has been given to the virtual character C, the virtual character C can perform an action not in the orientation that coincides with the marker direction, but in the orientation based on the position of the camera generating the image (that is, the virtual camera generating the virtual world image in which the virtual character C is arranged). For example, FIG. 11 shows the virtual character C performing an action in response to a sound for calling over the virtual character C (e.g., whistle sound) which has been inputted into the game apparatus 10 as an action instruction. As shown in FIG. 11, when the sound for calling over the virtual character C is inputted to the game apparatus 10, the virtual character C stands on its four legs and acts in such a manner that the forward direction of the virtual character C coincides with the direction to the virtual camera. That is, in the above action, the orientation in which the virtual character C is displayed is not set in the direction of the marker image MKi, but is set based on the position of the virtual camera which generates the virtual world image. It should be noted that a whistle sound is used as an example of the action instruction to cause the virtual character C to act in response to the sound for calling over the virtual character C in the above description. However, another sound may be used. For example, a clapping sound may be set as the sound for calling over the virtual character C as the action instruction to cause the virtual character C to act in response to the sound, and when a clapping sound is inputted, the virtual character C may move on its four legs in such a manner that the forward direction of the virtual character C coincides with the direction to the virtual camera. In this case, when a whistle sound is inputted, the virtual character C may perform an action of howling in such a manner that the forward direction of the virtual character C coincides with the direction to the virtual camera.

In the present embodiment, when an action instruction by means of a sound is given to the virtual character C, the action instruction given to the virtual character C may be changed depending on the direction in which the image of the virtual character C is being taken (being displayed) at the time when the action instruction is given. For example, in a case where a breath sound is inputted into the game apparatus 10, if the virtual character C is present in a display range of the upper LCD 22 and the forward direction of the virtual character C is directed toward the vicinity of the virtual camera at the time when the input is given, the virtual character C may act as if it hates being blown by the breath. On the other hand, if the forward direction of the virtual character C is not directed toward the vicinity of the virtual camera at the time when the breath sound is inputted into the game apparatus 10, even when the virtual character C is present in the display range of the upper LCD 22, the virtual character C does not act in accordance with the input or react at all. For example, the action of the virtual character C hating being blown by the breath is an action generated when the virtual character C is being displayed in the "normal state". In this case, the virtual character C is displayed in such an orientation that the forward direction of the virtual character C coincides with the forward direction of the marker image MKi. Therefore, it can be considered that such an action instruction can be enabled when the relationship between the marker direction and the position of the virtual camera satisfies a predetermined positional relationship.

As described above, in the present embodiment, a virtual object is arranged and additionally displayed in a real world image, which is taken by a real camera and displayed in the upper LCD 22, and the virtual object acts in accordance with an instruction based on a sound which has been recognized through sound recognition. Therefore, by employing a sound as an interface between the real space and the computer when realizing Augmented Reality (AR), the simplicity of input operations is improved, and a variety of input contents is allowed. Accordingly, the interactiveness between the real space and the computer is improved, and the interest and the operability are enhanced. Moreover, the operation by means of a sound input can enhance realistic feeling and directness of the operation compared with a case where a conventional input device such as an operation button, keyboard, touch panel, mouse, joystick, or track ball is used for the operation. In the example described above, the virtual character C is used as an example of the virtual object to be additionally displayed in the real world image. Alternatively, other virtual objects or letters may be additionally displayed in the real world image. In the example described above, the virtual character C which is additionally being displayed acts in accordance with an instruction based on a sound which has been recognized through sound recognition. However, another processing may be performed in accordance with an instruction based on a sound which has been recognized through sound recognition. For example, in accordance with an instruction based on a sound which has been recognized through sound recognition, various types of processing may be performed, such as: processing of altering virtual objects or letters additionally displayed in the real world image, processing of changing the display form thereof, processing of selection, processing of causing the virtual objects or letters to appear/disappear, and the like.

Figure 12:
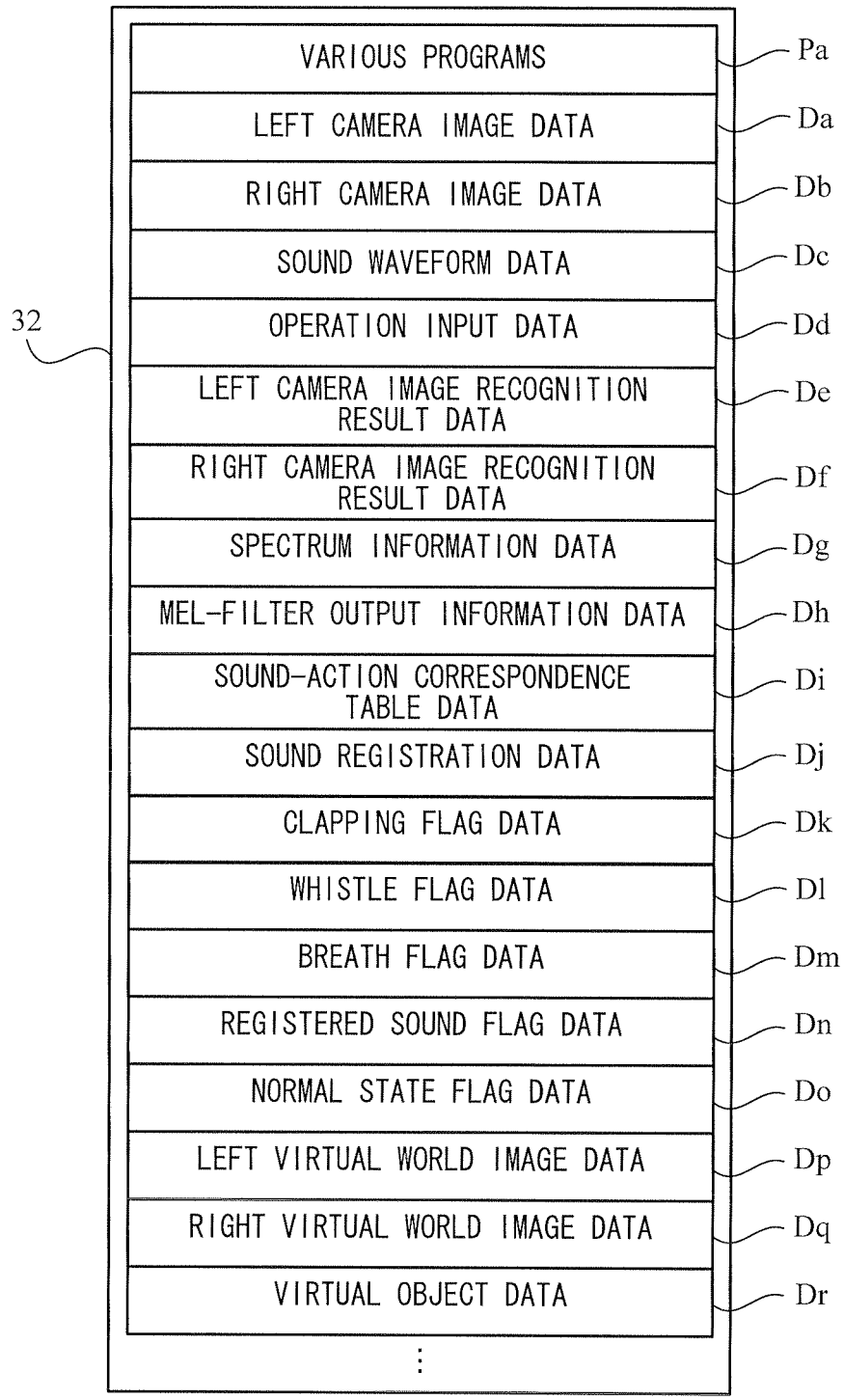
FIG. 12 shows an example of various kinds of data to be stored in a main memory 32 in accordance with an execution of an image processing program.
Figure 14:
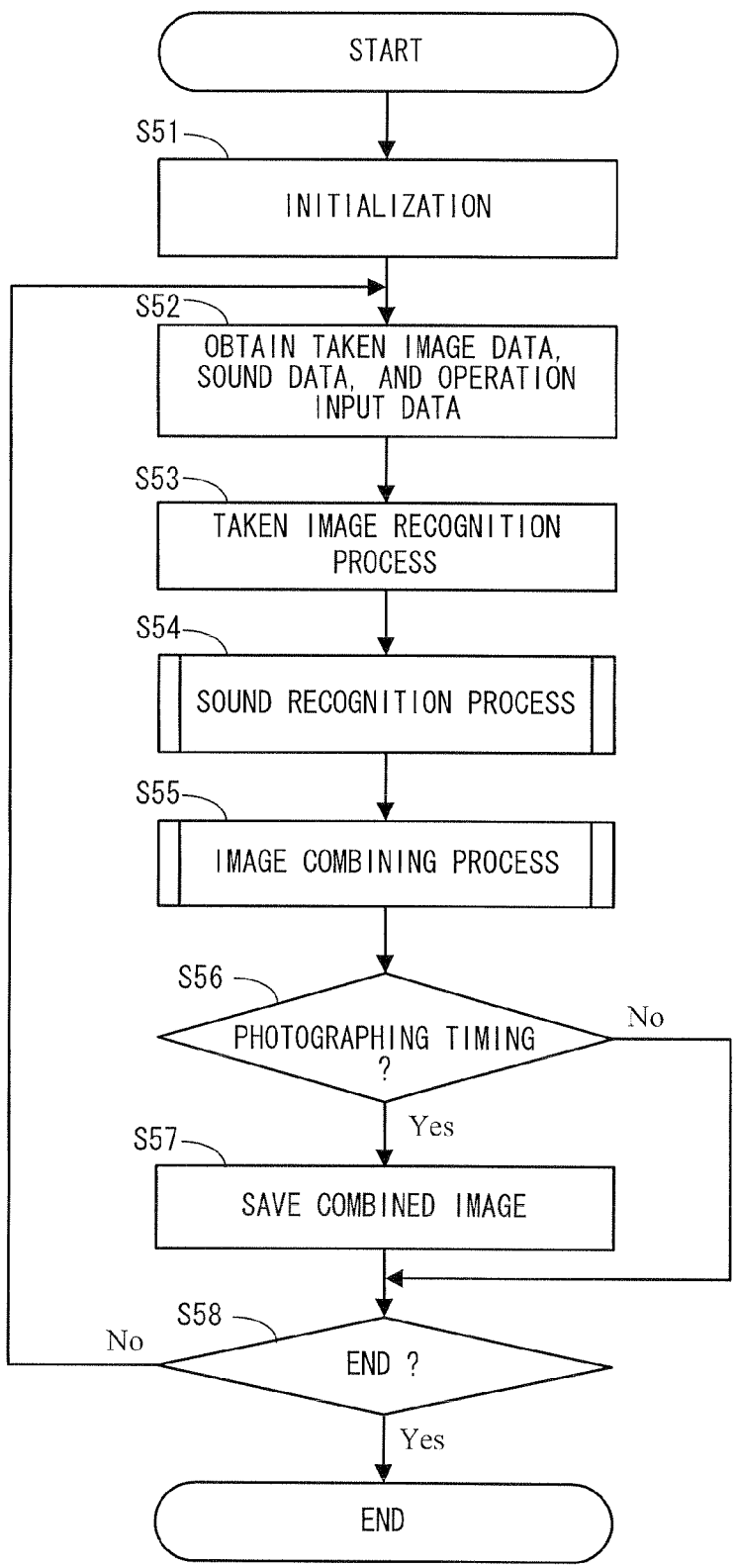
FIG. 14 is a flow chart showing an example of image processing operations performed by the game apparatus 10 in accordance with the execution of the image processing program.
Figure 15:
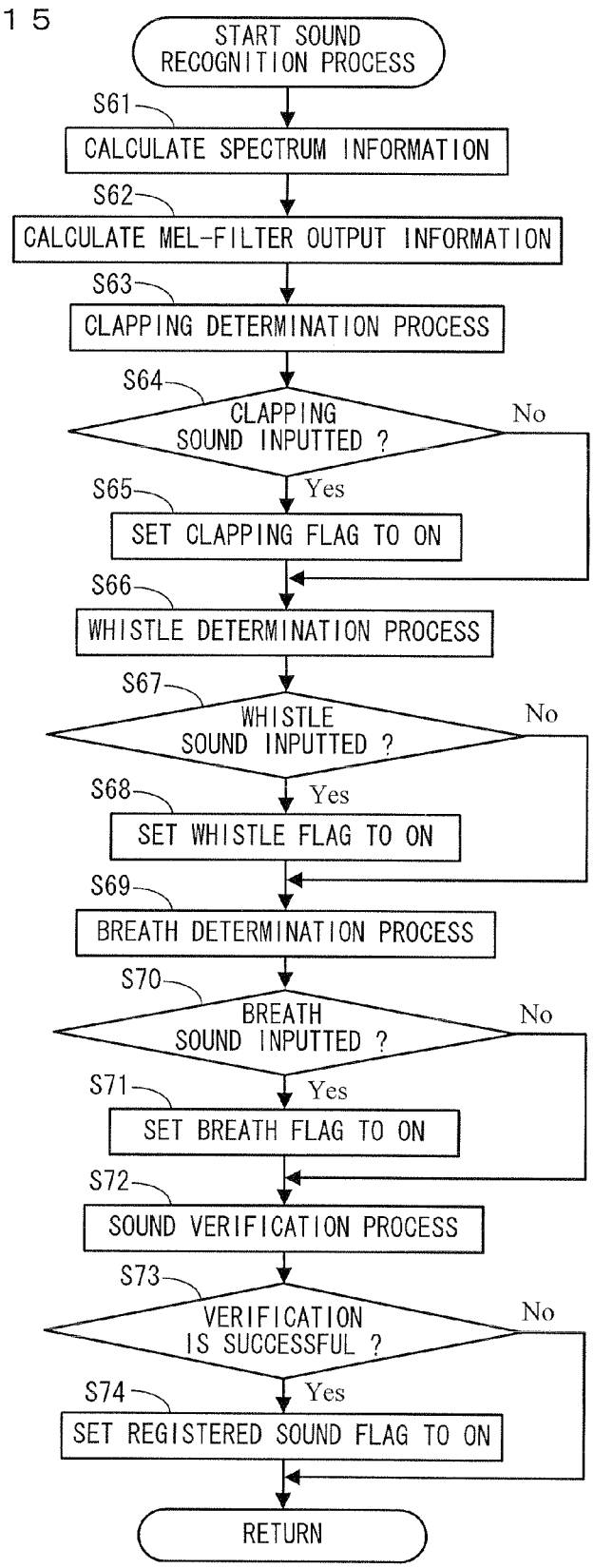
FIG. 15 is a sub-routine showing in detail an example of operations of a sound recognition process performed in step 54 in FIG. 14.
Figure 16:
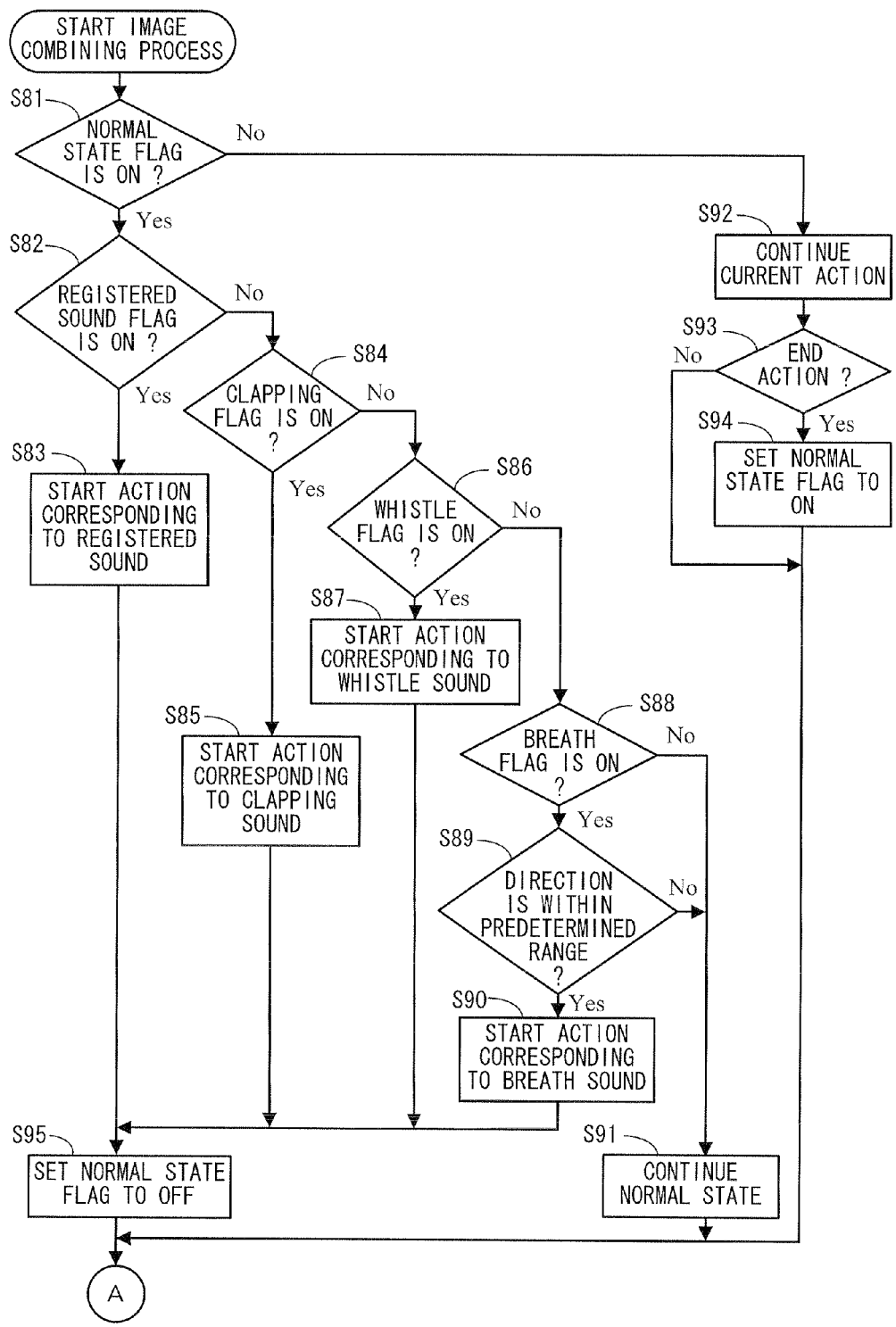
FIG. 16 is a sub-routine showing in detail an example of a first half of operations of a image combining process performed in step 55 in FIG. 14.
Figure 17:
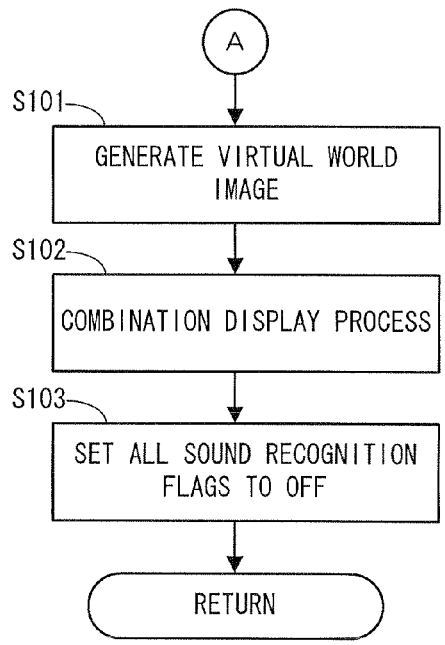
FIG. 17 is a sub-routine showing in detail an example of a second half of operations of the image combining process performed in step 55 in FIG. 14.

Next, with reference to FIG. 12 to FIG. 17, processing operations performed by the image processing program executed by the game apparatus 10 will be described in detail. FIG. 12 shows an example of various kinds of data to be stored in the main memory 32 in accordance with the execution of the image processing program. FIG. 13 shows an example of the sound-action correspondence table data Di in FIG. 12. FIG. 14 is a flow chart showing an example of image processing operations performed by the game apparatus 10 in accordance with the execution of the image processing program. FIG. 15 is a sub-routine showing in detail an example of operations of a sound recognition process performed in step 54 in FIG. 14. FIG. 16 is a sub-routine showing in detail an example of a first half of operations of an image combining process performed in step 55 in FIG. 14. FIG. 17 is a sub-routine showing in detail an example of a second half of operations of the image combining process performed in step 55 in FIG. 14. It should be noted that the program for performing these processes is included in the memory incorporated in the game apparatus 10 (e.g., internal data storage memory 35) or in the external memory 45 or the external data storage memory 46. When the game apparatus 10 is powered on, the program is loaded into the main memory 32 from the incorporated memory, or from the external memory 45 or the external data storage memory 46 via the external memory I/F 33 or the external data storage memory I/F 34, respectively, and the CPU 311 executes the program.

With reference to FIG. 12, the main memory 32 stores the program loaded from the incorporated memory, the external memory 45, or the external data storage memory 46, and temporary data generated in the image processing. In FIG. 12, the data storage area of the main memory 32 stores left camera image data Da, right camera image data Db, sound waveform data Dc, operation input data Dd, left camera image recognition result data De, right camera image recognition result data Df, spectrum information data Dg, Mel-filter output information data Dh, sound-action correspondence table data Di, sound registration data Dj, clapping flag data Dk, whistle flag data Dl, breath flag data Dm, registered sound flag data Dn, normal state flag data Do, left virtual world image data Dp, right virtual world image data Dq, virtual object data Dr, and the like. The program storage area of the main memory 32 stores various programs Pa forming the image processing program.

The left camera image data Da is data representing a latest camera image for a left eye taken by the outer left imaging section 23a. The right camera image data Db is data representing a latest camera image for a right eye taken by the outer right imaging section 23b. It should be noted that the cycle in which the outer left imaging section 23a and the outer right imaging section 23b take images, respectively, and the left camera image data Da and the right camera image data Db are updated by using the taken camera images, respectively, may be the same as the time unit of processing performed by the game apparatus 10 (e.g., 1/60 sec) or shorter than this time unit. In a case where the cycle of updating each of the left camera image data Da and the right camera image data Db is shorter than the cycle of processing performed by the game apparatus 10, each of the left camera image data Da and the right camera image data Db may be updated as appropriate, independently of the processing described below. In this case, in a step of obtaining taken images described below, latest camera images represented by the left camera image data Da and the right camera image data Db, respectively, may always be used.

The sound waveform data Dc is sound data corresponding to a sound waveform inputted through the microphone 43. For example, the sound waveform data Dc is sound data obtained at each sampling performed with respect to the microphone 43 (e.g., 128 samples for each time unit (one frame; e.g., 1/60 sec) of the game processing), and is used for each time unit of the game processing performed by the game apparatus 10. In the present embodiment, a history of frames, by the number of frames necessary for the sound recognition process described below, is stored as sound data of the sound waveform data Dc. Therefore, the sound data of the sound waveform data Dc may be updated in the FIFO method such that the sound data corresponding to the above number of frames is stored as the sound waveform data Dc.

The operation input data Dd is data representing information of the operation performed by the user onto the game apparatus 10. For example, the operation input data Dd includes data representing that an operational device such as the operation button 14, the analog stick 15, or the like of the game apparatus 10 has been operated by the user. The operation data from the operation button 14 or the analog stick 15 is obtained every time unit (e.g., 1/60 sec) of the processing performed by the game apparatus 10 and stored in the operation input data Dd, and the operation input data Dd is updated at each timing at which the operation data is obtained. In a process flow described below, an example is used in which the operation input data Dd is updated every frame, which is a process cycle. However, the operation input data Dd may be updated at another process cycle. For example, the operation input data Dd may be updated at every cycle of detecting that the user has operated an operational device such as the operation button 14 or the analog stick 15, and the updated operation input data Dd may be used for each process cycle. In this case, the cycle of updating the operation input data Dd is different from the process cycle.

The left camera image recognition result data De is data regarding the positional relationship between the outer left imaging section 23a and the marker MK and calculated by using a camera image for a left eye taken by the outer left imaging section 23a. As a first example, the data regarding the positional relationship is data representing a relative positional relationship between the outer left imaging section 23a and the marker MK. As an example, the data regarding the positional relationship is data representing the position and/or the orientation of the outer left imaging section 23a in the real world with reference to the position of the marker MK. As another example, the data regarding the positional relationship is data representing the position and/or the orientation of the marker MK in the real world with reference to the position and the imaging direction of the outer left imaging section 23a. As a second example, the data regarding the positional relationship is data representing a matrix calculated by recognizing the position and/or the orientation of the marker image MKi in a camera image taken by the outer left imaging section 23a. For example, the matrix is a coordinate transformation matrix for transforming coordinates represented in a coordinate system set with reference to the position and the orientation of the marker MK (marker coordinate system) into a coordinate system represented with reference to the position and the orientation of the outer left imaging section 23a (outer left imaging section coordinate system). That is, the matrix is a matrix including information of the position and the orientation of the outer left imaging section 23a relative to the position and the orientation of the marker MK, and more specifically, is a matrix including information of the position and the orientation of the outer left imaging section 23a in the marker coordinate system.

The right camera image recognition result data Df is data regarding the positional relationship between the outer right imaging section 23b and the marker MK and calculated by using a camera image for a right eye taken by the outer right imaging section 23b. As a first example, the data regarding the positional relationship is data representing a relative positional relationship between the outer right imaging section 23b and the marker MK. As an example, the data regarding the positional relationship is data representing the position and/or the orientation of the outer right imaging section 23b in the real world with reference to the position of the marker MK. As another example, the data regarding the positional relationship is data representing the position and/or the orientation of the marker MK in the real world with reference to the position and the imaging direction of the outer right imaging section 23b. As a second example, the data regarding the positional relationship is data representing a matrix calculated by recognizing the position and/or the orientation of the marker image MKi in a camera image taken by the outer right imaging section 23b. For example, the matrix is a coordinate transformation matrix for transforming coordinates represented in the marker coordinate system into a coordinate system represented with reference to the position and the orientation of the outer right imaging section 23b (outer right imaging section coordinate system). That is, the matrix is a matrix including information of the position and the orientation of the outer right imaging section 23b relative to the position and the orientation of the marker MK, and more specifically, is a matrix including information of the position and the orientation of the outer right imaging section 23b in the marker coordinate system.

It should be noted that, in this specification, the matrix that transforms the marker coordinate system into the outer left imaging section coordinate system or into the outer right imaging section coordinate system is referred to as a "marker-camera transformation matrix". That is, each of the above matrixes is a "marker-camera transformation matrix".

The spectrum information data Dg is data representing a spectrum obtained by subjecting sound waveform information representing the sound waveform of the sound inputted through the microphone 43 to Fast Fourier Transform (FFT) analysis for a short period of time, and stores data corresponding to the number of frames necessary for the sound recognition process described below.

The Mel-filter output information data Dh is data representing an output of a band-pass filter bank obtained by subjecting the spectrum obtained by the FFT analysis to Mel-filter bank analysis, and stores data corresponding to the number of frames necessary for the sound recognition process described below.

The sound-action correspondence table data Di is data representing a table which contains descriptions of actions to be instructed in accordance with sound recognition results, respectively. As shown in FIG. 13, the sound-action correspondence table data Di describes contents of the actions performed by the character and the bases on which the actions are performed in accordance with sound recognition results, respectively. For example, it is described that when a sound recognition result is obtained indicating that the inputted sound has been verified as a registered sound 1 (e.g., "sit down") which has been registered in advance or through a registration operation, the character performs an action of sitting down on a marker basis in accordance with the sound input. It is also described that when a sound recognition result is obtained indicating that a clapping sound has been inputted, the character stands on its four legs and changes its orientation toward the camera on a camera basis in accordance with the sound input. It is also described that when a sound recognition result is obtained indicating that a whistle sound has been inputted, the character changes its orientation toward the camera and performs an action of howling on the camera basis in accordance with the sound input. Here, registered sounds described in the sound-action correspondence table data Di may each be registered by using a sound (words) which is inputted in advance by the user when the user is urged to input a sound by the game apparatus 10, as described below, or may be registered in advance when the image processing program is installed. With respect to action bases described in the sound-action correspondence table data Di, actions performed by the character with reference to the marker direction are defined as "marker basis", and actions performed by the character with reference to the position or the direction of the virtual camera are defined as "camera basis".

The sound registration data Dj is data representing a sound (words) inputted to be registered in advance by the user when urged to input a sound by the game apparatus 10. For example, when the user registers a sound, the user is urged to input a sound corresponding to an action instruction to be given to the character. Then, data representing the inputted sound is registered in the sound registration data Dj in association with the action instruction for which the user has been urged to input a sound (for example, in association with a registered sound number described in the sound-action correspondence table data Di). It should be noted that the sound to be registered into the sound registration data Dj may be registered in advance when the image processing program is installed.

The clapping flag data Dk is data representing a clapping flag, which is set to ON when it is determined in the sound recognition process that the sound inputted through the microphone 43 is a clapping sound. The whistle flag data Dl is data representing a whistle flag, which is set to ON when it is determined in the sound recognition process that the sound inputted through the microphone 43 is a whistle sound. The breath flag data Dm is data representing a breath flag, which is set to ON when it is determined in the sound recognition process that the sound inputted through the microphone 43 is a breath sound. The registered sound flag data Dn is data representing a registered sound flag, which is set to ON when it is determined in the sound recognition process that the sound inputted through the microphone 43 has been verified as a registered sound. The normal state flag data Do is data representing a normal state flag, which is set to ON when the virtual character C is in "normal state".

The left virtual world image data Dp is data representing an image of a virtual space in which a virtual object is arranged and which is seen from a left virtual camera (a virtual world image for a left eye). For example, the left virtual world image data Dp is data representing a virtual world image for a left eye which is obtained by perspectively projecting a virtual space in which a virtual object is arranged and which is seen from the left virtual camera. The right virtual world image data Dq is data representing an image of a virtual space in which a virtual object is arranged and which is seen from a right virtual camera (a virtual world image for a right eye). For example, the right virtual world image data Dq is data representing a virtual world image for right eye which is obtained by perspectively projecting a virtual space in which a virtual object is arranged and which is seen from the right virtual camera.

The virtual object data Dr is information regarding the above described virtual object, and includes 3D model data (polygon data) representing the shape of the virtual object, texture data representing a pattern of the virtual object, information of the position and the orientation of the virtual object in the virtual space, and the like.

Next, with reference to FIG. 14, operations performed by the information processing section 31 will be described. First, when the power supply (power button 14F) of the game apparatus 10 is turned on, a boot program (not shown) is executed by the CPU 311, whereby the program stored in the incorporated memory, the external memory 45, or the external data storage memory 46 is loaded to the main memory 32. Then, the loaded program is executed in the information processing section 31 (CPU 311), whereby steps shown in FIG. 14 (each step is abbreviated as "S" in FIG. 14 to FIG. 17) are performed. With respect to FIG. 14 to FIG. 17, description of processes not directly relevant to the present invention will be omitted. In the present embodiment, processes of all the steps in the flow charts in FIG. 14 to FIG. 17 are performed by the CPU 311. However, processes of some steps in the flow charts in FIG. 14 to FIG. 17 may be performed by a processor other than the CPU 311 or a dedicated circuit.

In FIG. 14, the CPU 311 performs initialization (step 51) of the image processing and advances the process to the next step. For example, the CPU 311 initializes parameters to be used in the image processing in step 51. It should be noted that the CPU 311 initializes all the sound recognition flags (clapping flag, whistle flag, breath flag, and registered sound flag) by setting them to OFF, and initializes the normal state flag by setting it to ON.

Next, the CPU 311 obtains taken image data representing both camera images outputted from the outer imaging section 23 (that is, a camera image for a left eye and a camera image for a right eye), sound data corresponding to the sound waveform of a sound inputted through the microphone 43, and operation input data representing information of operations performed by the user onto operational devices such as the operation button 14 and the analog stick 15 (step 52), and advances the process to the next step. For example, the CPU 311 updates the left camera image data Da by using the obtained taken image data representing the camera image for a left eye. The CPU 311 updates the right camera image data Db by using the obtained taken image data representing the camera image for a right eye. The CPU 311 updates the sound waveform data Dc by using the obtained sound data. Then, the CPU 311 updates the operation input data Dd by using the obtained operation input data.

Next, the CPU 311 performs a taken image recognition process by using the taken image data representing the camera image for a left eye and the taken image data representing the camera image a right eye (step 53), and advances the process to the next step. Hereinafter, an example of the taken image recognition process performed in step 53 will be described.

As described above, the outer left imaging section 23a and the outer right imaging section 23b are spaced from each other by a certain distance in the upper housing 21. Accordingly, when images of the marker MK are taken by the outer left imaging section 23a and the outer right imaging section 23b at the same time, respectively, there is a deviation due to parallax between the position and the orientation of the marker MK in the left camera image taken by the outer left imaging section 23a and the position and the orientation of the marker MK in the right camera image taken by the outer right imaging section 23b. In the taken image recognition process, the positional relationship between the outer left imaging section 23a and the outer right imaging section 23b, and the marker MK is calculated.

For example, the CPU 311 determines whether both of the left and the right camera images include the marker MK by means of a pattern matching technique or the like. When the marker MK (marker image MKi) is included in the camera images, the CPU 311 calculates the positional relationship between the outer left imaging section 23a and the marker MK, and the positional relationship between the outer right imaging section 23b and the marker MK, based on the position and the orientation of the marker MK in the camera images, respectively. As an example, the CPU 311 calculates a marker-camera transformation matrix for a left eye by recognizing the position and/or the orientation of the marker image MKi in the camera image for a left eye, and updates the left camera image recognition result data De. Meanwhile, the CPU 311 calculates a marker-camera transformation matrix for a right eye by recognizing the position and/or the orientation of the marker image MKi in the camera image for a right eye, and updates the right camera image recognition result data Df.

It should be noted that the marker-camera transformation matrix for a left eye is a matrix reflecting the position and the orientation of the outer left imaging section 23a calculated based on the position and the orientation of the marker MK in the left camera image. More specifically, the marker-camera transformation matrix for a left eye is a coordinate transformation matrix for transforming coordinates represented in the marker coordinate system (coordinate system having the position of the marker MK in the real world defined as the origin and having the axes in the longitudinal direction (Z-axis direction), the lateral direction (X-axis direction), and the normal direction (Y-axis direction) of the marker MK), into coordinates represented in the outer left imaging section coordinate system defined with reference to the position and the orientation of the outer left imaging section 23a calculated based on the position and the orientation of the marker image MKi in the left camera image.

The marker-camera transformation matrix for a right eye is a matrix reflecting the position and the orientation of the outer right imaging section 23b calculated based on the position and the orientation of the marker MK in the right camera image. More specifically, the marker-camera transformation matrix for a right eye is a coordinate transformation matrix for transforming coordinates represented in the marker coordinate system into coordinates represented in the outer right imaging section coordinate system defined with reference to the position and the orientation of the outer right imaging section 23b calculated based on the position and the orientation of the marker image MKi in the right camera image.

Here, in AR, by designating the marker-camera transformation matrix for a left eye for transforming the marker coordinate system into the outer left imaging section coordinate system as a view matrix for the left virtual camera, and by designating the marker-camera transformation matrix for a right eye for transforming the marker coordinate system into the outer right imaging section coordinate system as a view matrix for the right virtual camera, it is possible to combine CG images (left virtual world image and right virtual world image) with the real world images (left camera image and right camera image), respectively.

In step 53, in a case where the marker image MKi is not recognized in at least one of the left camera image and the right camera image, a null value is stored as the marker-camera transformation matrix for a left eye and/or the marker-camera transformation matrix for a right eye in the left camera image recognition result data De and/or the right camera image recognition result data Df, respectively. Accordingly, a failure of recognition of the marker MK in the left camera image or the right camera image is recorded.

It is assumed that there is no difference between the accuracies of recognizing the marker and there is no difference between the accuracies of mounting the outer left imaging section 23a and the outer right imaging section 23b onto the game apparatus 10. In this case, the position of the right virtual camera calculated based on the result of the image recognition of the right camera image is the position which is obtained by displacing the position of the left virtual camera calculated based on the result of the image recognition of the left camera image, by a certain distance along the lateral direction (e.g., X-axis direction) of the left virtual camera coordinate system. That is, the orientation of the right virtual camera calculated based on the result of the image recognition of the right camera image is the same as the orientation of the left virtual camera calculated based on the result of the image recognition of the left camera image (that is, the X-axis, the Y-axis, the Z-axis of the left virtual camera coordinate system are parallel to the X-axis, the Y-axis, and the Z-axis of the right virtual camera coordinate system, respectively). Accordingly, based on the position and the orientation of one virtual camera (e.g., left virtual camera) calculated based on a result of image recognition of one camera image (e.g., left camera image), the position and the orientation of the other virtual camera (e.g., right virtual camera) may be determined, and the other marker-camera transformation matrix may be calculated. In this case, the image recognition process with respect to the other camera image (e.g., right camera image) is not necessary.

Next, the CPU 311 performs a sound recognition process (step 54) and advances the process to the next step. Hereinafter with reference to FIG. 15, the sound recognition process performed in step 54 will be described.

In FIG. 15, the CPU 311 calculates spectrum information based on the sound waveform of the sound inputted through the microphone 43 (step 61), and advances the process to the next step. For example, the CPU 311 calculates a spectrum by subjecting the sound waveform information stored in the sound waveform data Dc to FFT analysis for a short period of time, and updates the spectrum information data Dg by using the spectrum.

Next, the CPU 311 calculates Mel-filter output information based on the spectrum calculated in step 61 (step 62), and advances the process to the next step. For example, the CPU 311 calculates an output of a band-pass filter bank by subjecting the spectrum stored in the spectrum information data Dg to Mel-filter bank analysis, and updates the Mel-filter output information data Dh by using data representing the output.

Next, the CPU 311 performs a clapping determination process (step 63) and advances the process to the next step. For example, the CPU 311 determines whether a clapping sound is inputted through the microphone 43, by using the sound waveform information stored in the sound waveform data Dc. As an example, the CPU 311 obtains the maximum value of the amplitude level in the sound waveform corresponding to the latest frame stored in the sound waveform data De, and stores the history of such maximum values corresponding to a predetermined period of time (e.g., nine frames). Then, the CPU 311 determines that the inputted sound is a clapping sound, when a maximum value corresponding to the middle time point of the predetermined period of time in the maximum value history (for example, in the maximum value history corresponding to nine frames, the maximum value in the fifth frame) is greater than or equal to a predetermined threshold value $\alpha$, and when maximum values corresponding to the history before and after the above maximum value (for example, the history corresponding to two frames before and after the fifth frame) are all less than or equal to a predetermined threshold value $\beta$, and when the average value of the whole maximum value history is less than or equal to a predetermined threshold value $\gamma$. In this manner, in the example of the clapping determination process performed in step 63, only the information representing the sound waveform of the sound inputted through the microphone 43 is referred to, and when a sound waveform that has an outstanding amplitude in a relatively short period of time is obtained, it is determined that the inputted sound is a clapping sound.

Next, the CPU 311 determines whether it has been determined in the clapping determination process in step 63 that a clapping sound has been inputted (step 64). When it has been determined that a clapping sound has been inputted, the CPU 311 updates the clapping flag data Dk by setting the clapping flag to ON (step 65), and advances the process to the next step 66. Meanwhile, when it has been determined that a clapping sound has not been inputted, the CPU 311 advances the process directly to the next step 66.

In step 66, the CPU 311 performs a whistle determination process and advances the process to the next step. For example, the CPU 311 determines whether a whistle sound has been inputted through the microphone 43 by using the spectrum stored in the spectrum information data Dg. As an example, the CPU 311 subjects spectrum data corresponding to the latest frame stored in the spectrum information data Dg to logarithmic transformation and transforms the spectrum data into decibel data. Next, when in the frequency range corresponding to the latest one frame (for example, frequency in horizontal axis, decibel in vertical axis), the number of times of cases where the decibel value of the spectrum is greater than or equal to a reference decibel value $\delta$ is one, and the average decibel value in a low frequency value range is less than a reference value $\epsilon$, the CPU 311 counts a whistle event. Then, when in the history corresponding to a predetermined number of frames immediately prior to the whistle event, the total number of whistle event counts is greater than or equal to a threshold value the CPU 311 determines that the inputted sound is a whistle sound. In this manner, in the example of the whistle determination process in step 66, it is determined whether the inputted sound is a whistle sound, by referring only to the spectrum information obtained from the sound waveform of the sound inputted through the microphone 43.

Next, the CPU 311 determines whether it has been determined in the whistle determination process in step 66 that a whistle sound has been inputted (step 67). When it has been determined that a whistle sound has been inputted, the CPU 311 updates the whistle flag data Dl by setting the whistle flag to ON (step 68), and advances the process to the next step 69. On the other hand, when it has been determined that a whistle sound has not been inputted, the CPU 311 advances the process directly to the next step 69.

In step 69, the CPU 311 performs a breath determination process and advances the process to the next step. For example, the CPU 311 determines whether a breath sound has been inputted through the microphone 43 by using the sound waveform information stored in the sound waveform data Dc and the output of the band-pass filter bank stored in the Mel-filter output information data Dh. As an example, the CPU 311 determines whether the average amplitude value and the maximum amplitude value of the sound waveform stored in the sound waveform data Dc are within predetermined ranges, respectively. Further, the CPU 311 determines whether the number of zero crosses of the sound waveform (a zero cross is a point at which a sound waveform crosses the zero level when the amplitude thereof becomes from a plus value to a minus value or vice-versa) is less than or equal to a predetermined threshold value $\eta$. Further, the CPU determines, with respect to the output of the band-pass filter bank stored in the Mel-filter output information data Dh, whether the average value of amplitudes in a frequency range which does not include a low frequency range is greater than or equal to a predetermined threshold value $\theta$. Then, if all the above determinations are positive, the CPU 311 determines that the inputted sound is a breath sound. In this manner, in the example of the breath determination process in step 69, it is determined whether the inputted sound is a breath sound, by referring to the sound waveform of the sound inputted through the microphone 43 and the Mel-filter output information.

Next, the CPU 311 determines whether it has been determined in the breath determination process in step 69 that a breath sound has been inputted (step 70). Then, when it has been determined that a breath sound has been inputted, the CPU 311 updates the breath flag data Dm by setting the breath flag to ON (step 71), and advances the process to the next step 72. On the other hand, when it has been determined that a breath sound has not been inputted, the CPU 311 advances the process directly to next step 72.

In step 72, the CPU 311 performs a sound verification process and advances the process to the next step. The CPU 311 determines the likelihood of a feature parameter time series obtained from the sound input pattern inputted through the microphone 43 against a feature parameter time series registered in advance, and determines that a registered sound which has a likelihood which is the maximum and greater than or equal to a predetermined threshold value corresponds to the inputted sound. For example, the CPU 311 determines whether there is a registered sound which can be verified as the sound inputted though the microphone 43, by using the sound waveform information stored in the sound waveform data Dc and the output of the band-pass filter bank stored in the Mel-filter output information data Dh. As an example, the CPU 311 detects a section (sound section) during which the sound has been inputted through the microphone 43, by using the sound waveform information stored in the sound waveform data Dc and the output of the band-pass filter bank stored in the Mel-filter output information data Dh. Specifically, based on the shape of the spectrum obtained from the output of the band-pass filter bank, the CPU 311 detects the time point at which the input of the sound through the microphone 43 has been started, and based on the level of the sound waveform, detects the time point at which the input of the sound through the microphone 43 has been ended, and defines the interval between these time points as a sound section. It should be noted that the time point at which the sound input has been started may be determined by checking the level of the sound waveform in the history of the past sound waveforms. Then, with respect to the output of the band-pass filter bank obtained in the detected sound section, the CPU 311 performs normalization of the time axis and normalization of the level by using a triangular window, and calculates by using a dynamic programming method the distance between the resultant value and each pieces of the registered sound data (registered data) registered in the sound registration data Dj. If the calculated distance is less than or equal to a predetermined threshold value t, the CPU 311 determines that the inputted sound has been verified as the piece of the registered data which has the distance described above. As described above, in the example of the breath determination process in step 69, the process of verifying the inputted sound against the registered sound is performed by referring to the sound waveform of the sound inputted through the microphone 43 and the Mel-filter output information.

Next, the CPU 311 determines whether the inputted sound has been verified as a registered sound in the sound verification process in step 72 (step 73). When the inputted sound has been verified as a registered sound, the CPU 311 updates the registered sound flag data Dn by setting the registered sound flag to ON (step 74), and ends the process of the sub-routine. On the other hand, when the input sound has not verified as a registered sound, the CPU 311 ends the processes of the sub-routine.

With reference back to FIG. 14, after the sound recognition process in step 54, the CPU 311 performs an image combining process (step 55), and advances the process to the next step. Hereinafter, with reference to FIG. 16, the image combining process performed in step 55 will be described.

In FIG. 16, the CPU 311 determines whether the normal state flag represented by the normal state flag data Do is ON (step 81). When the normal state flag is ON, the CPU 311 advances the process to the next step 82. On the other hand, when the normal state flag is OFF, the CPU 311 advances the process to the next step 92.

In step 82, the CPU 311 determines whether the registered sound flag represented by the registered sound flag data Dn is ON. When the registered sound flag is ON, the CPU 311 advances the process to the next step 83. On the other hand, when the registered sound flag is OFF, the CPU 311 advances the process to the next step 84.

In step 83, the CPU 311 causes, in accordance with the registered sound which has been verified as the sound input, the virtual character C to start an action corresponding to the registered sound, and advances the process to the next step 95. For example, with reference to the sound-action correspondence table data Di, the CPU 311 extracts a character action and an action basis corresponding to the registered sound which has been verified as the sound input, and causes the virtual character C to start the action based on the extracted character action and action basis.

Meanwhile, in step 84, the CPU 311 determines whether the clapping flag represented by the clapping flag data Dk is ON. When the clapping flag is ON, the CPU 311 advances the process to the next step 85. On the other hand, when the clapping flag is OFF, the CPU 311 advances the process to the next step 86.

In step 85, the CPU 311 causes the virtual character C to start an action corresponding to the input of the clapping sound, and advances the process to the next step 95. For example, with reference to the sound-action correspondence table data Di, the CPU 311 extracts a character action and an action basis corresponding to the recognition of the clapping sound, and causes the virtual character C to start the action in accordance with the extracted character action and action basis.

In step 86, the CPU 311 determines whether the whistle flag represented by the whistle flag data Dl is ON. When the whistle flag is ON, the CPU 311 advances the process to the next step 87. On the other hand, when the whistle flag is OFF, the CPU 311 advances the process to the next step 88.

In step 87, the CPU 311 causes the virtual character C to start an action corresponding to the input of the whistle sound, and advances the process to the next step 95. For example, with reference to the sound-action correspondence table data Di, the CPU 311 extracts a character action and an action basis corresponding to the recognition of the whistle sound, and causes the virtual character C to start the action in accordance with the extracted character action and action basis.

In step 88, the CPU 311 determines whether the breath flag represented by the breath flag data Dm is ON. When the breath flag is ON, the CPU 311 advances the process to the next step 89. On the other hand, when the breath flag is OFF, the CPU 311 advances the process to the next step 91.

In step 89, the CPU 311 determines whether the direction in which the virtual character C is being displayed is within a predetermined range. As described above, in a case where a breath sound is inputted into the game apparatus 10, when the virtual character C is present in the display range of the upper LCD 22 and when the forward direction of the virtual character C is directed toward the vicinity of the virtual camera at the time when the input has been performed, the action instruction corresponding to the input is enabled. For example, when the position of the virtual character C is within the display range of the upper LCD 22 (that is, the position at which the virtual character C is arranged is within the view volume of the left virtual camera and/or the view volume of the right virtual camera), and when the left virtual camera and/or right virtual camera is arranged within a predetermined range which is defined with reference to the forward direction of the virtual character C, the CPU 311 makes a positive determination in step 89. When a positive determination has been made in step 89, the CPU 311 advances the process to the next step 90. On the other hand, when a negative determination is made in step 89, the CPU 311 advances the process to the next step 91.

In step 90, the CPU 311 causes the virtual character C to start an action corresponding to the input of the breath sound, and advances the process to the next step 95. For example, with reference to the sound-action correspondence table data Di, the CPU 311 extracts a character action and an action basis corresponding to the recognition of the breath sound, and causes the virtual character C to start the action in accordance with the extracted character action and action basis.

In step 91, the CPU 311 causes the virtual character C to continue the action in the normal state, which action is the same action currently being performed, and advances the process to the next step 101 (see FIG. 17).

After the process of causing the virtual character C to start the action corresponding to the input of the sound which has been recognized through sound recognition (step 83, step 85, step 87, and step 90), the CPU 311 updates the normal state flag represented by the normal state flag data Do to OFF (step 95), and advances the process to the next step 101.

In step 81, when it has been determined that the normal state flag is set to OFF, the CPU 311 causes the virtual character C to continue the action which it is currently performing (step 92), and advances the process to the next step. Here, as is described below, the normal state flag is set to OFF at the time when the virtual character C starts the action corresponding to the input of the sound which has been recognized through sound recognition, and is set to ON at the time when the virtual character C has ended the action. That is, in the image processing, even if another sound recognition is performed while the virtual character C is performing the action corresponding to the input of the sound which has been recognized through sound recognition, the current action is performed with priority.

Next, the CPU 311 determines whether the action of the virtual character C corresponding to the input of the sound which has been recognized through sound recognition has been ended (step 93). When the action of the virtual character C corresponding to the input of the sound which has been recognized through sound recognition is ended, the CPU 311 updates the normal state flag represented by the normal state flag data Do to ON (step 94), and advances the process to the next step 101. On the other hand, when the action of the virtual character C corresponding to the input of the sound which has been recognized through sound recognition is being continued, the CPU 311 advances the process directly to the next step 101.

Figure 18:
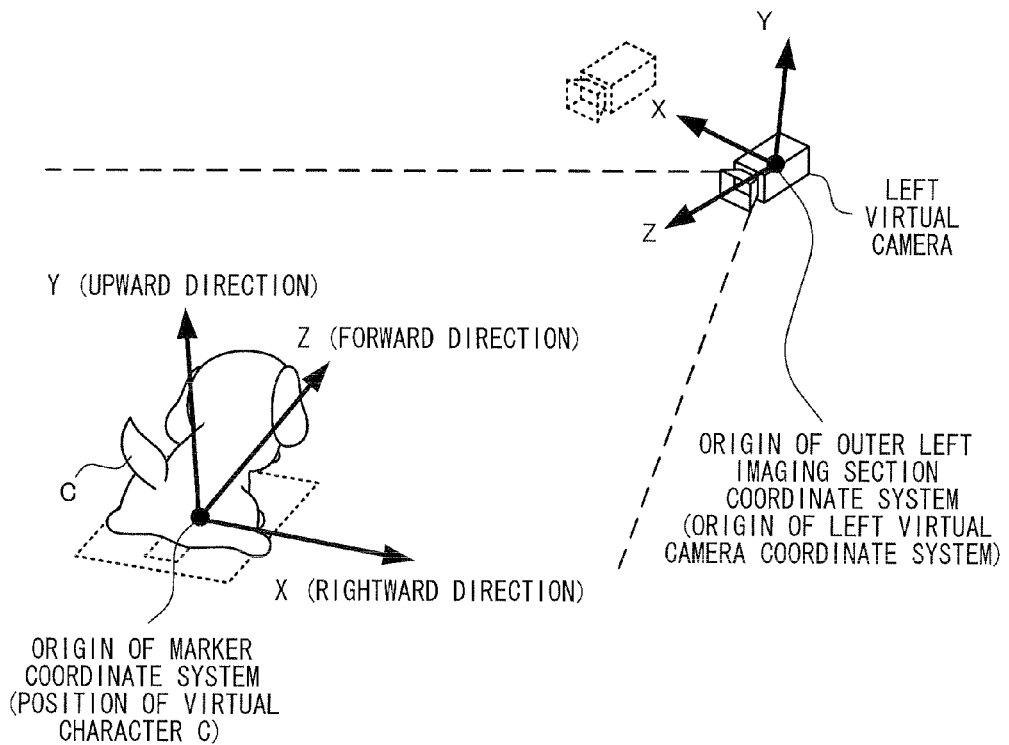
FIG. 18 shows an example of a positional relationship between a virtual character C and a left virtual camera.
Figure 19:
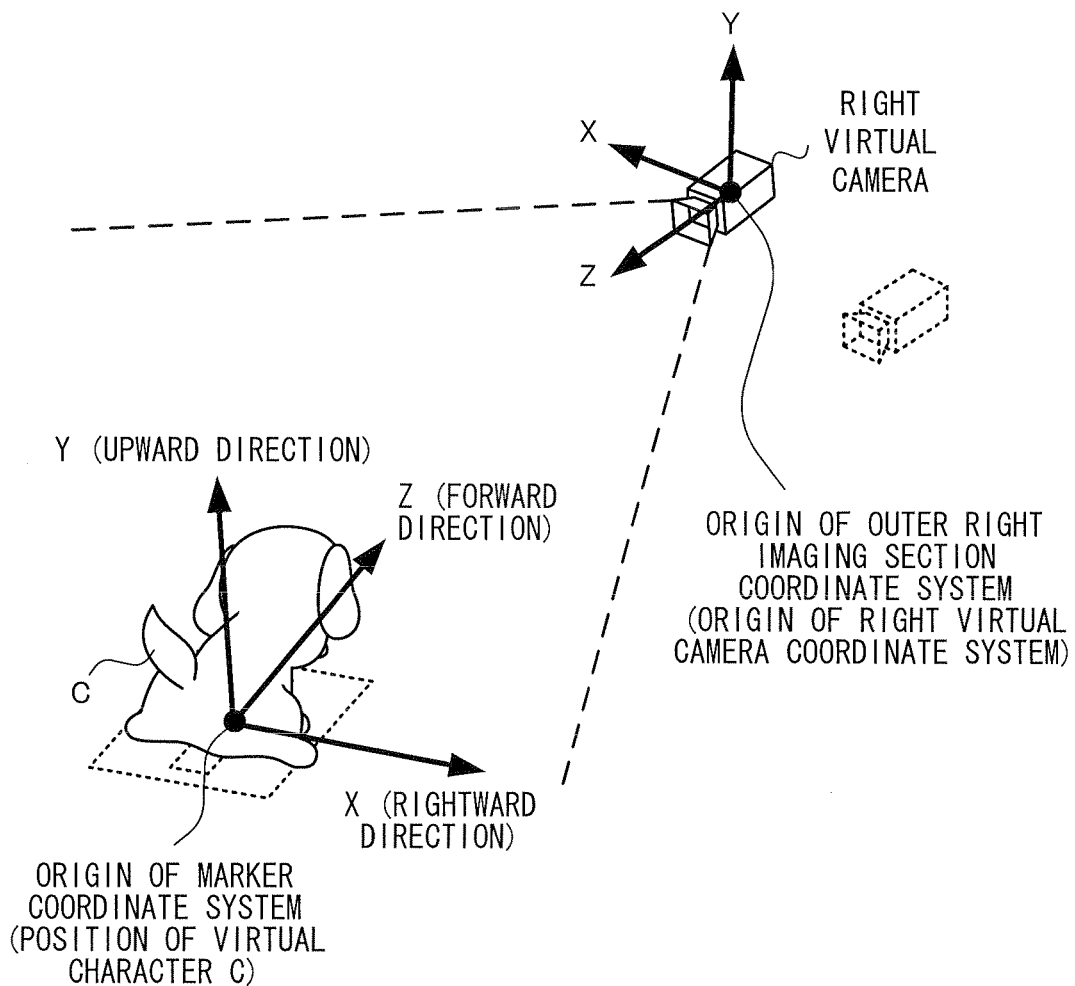
FIG. 19 shows an example of a positional relationship between the virtual character C and a right virtual camera.

With reference to FIG. 17, in step 101, the CPU 311 generates a virtual world image and advances the process to the next step. For example, as shown in FIG. 18 and FIG. 19, the CPU 311 arranges the virtual character C in the virtual space defined by the marker coordinate system (the coordinate system having the position of marker image MKi defined as the origin and having the axes in the longitudinal direction (Z-axis direction), the lateral direction (X-axis direction), and the normal direction (Y-axis direction) of the marker image MKi), changes the size of the virtual character C as necessary, and causes the virtual character C to perform the action set through the steps 81 to step 95. For example, when the virtual character C is caused to walk around the origin of the marker coordinate system, a display as if the virtual character C is walking around the marker image MKi is shown. The control of the movement of the virtual character C is realized by changing the position coordinates of the virtual character C at the origin or the vicinity of the origin of the marker coordinate system, and in a direction which is defined with reference to the plane including the marker image Mki (for example, at a position in a predetermined range in the Y-axis direction which is defined with reference to a direction on the X-Z plane in the marker coordinate system).

In the process in step 101, the vertical direction (Y-axis negative direction) in the marker coordinate system is defined as the vertical direction of the virtual space, and the virtual character C is arranged in this virtual space. When an action basis (e.g., marker basis or camera basis, see FIG. 13) is assigned to the action being currently performed by the virtual character C, the direction of the virtual character C is set in accordance with the action basis. For example, in the case of an action whose action basis is set to the marker basis, the orientation of the virtual character C in the virtual space is controlled such that the forward direction of the virtual character C coincides with the longitudinal positive direction (Z-axis positive direction) of the marker coordinate system, which corresponds to the marker direction (e.g., the forward direction of the marker image MKi), or is within a predetermined range from the marker direction. In the case of an action whose action basis is set to the camera basis, the orientation of the virtual character C in the virtual space is controlled such that the forward direction of the virtual character C coincides with the direction which passes through the middle point between the position of the left virtual camera and the position of the right virtual camera, or passes through a point in a predetermined range from the middle point. It should be noted that the position of the left virtual camera and the position of the right virtual camera in the virtual space defined in the marker coordinate system can be calculated by using the marker-camera transformation matrix for a left eye and the marker-camera transformation matrix for a right eye calculated in step 53.

As shown in FIG. 18, the CPU 311 creates the virtual space seen from the left virtual camera as a virtual world image for a left eye, and updates the left virtual world image data Dp. For example, by designating the marker-camera transformation matrix for a left eye represented by the left camera image recognition result data De as a view matrix for the left virtual camera, the CPU 311 can display a CG model (virtual character C) expressed in the marker coordinate system at the same position where the CG model would be displayed on the upper LCD 22 (e.g., on the marker image MKi in a left camera image) if the CG model existed in the real world. That is, in the display image for a left eye displayed on the upper LCD 22, it is possible to display the virtual object arranged in the virtual space defined by the marker coordinate system as if the virtual object exists in association with the marker MK in the real world.

As shown in FIG. 19, the CPU 311 creates the virtual space seen from the right virtual camera as a virtual world image for a right eye, and updates the right virtual world image data Dq. For example, by designating the marker-camera transformation matrix for a right eye represented by the right camera image recognition result data Df as a view matrix for the right virtual camera, the CPU 311 can display a CG model (virtual character C) expressed in the marker coordinate system at the same position where the CG model would be displayed on the upper LCD 22 (e.g., on the marker image MKi in a right camera image) if the CG model existed in the real world. That is, in the display image for a right eye displayed on the upper LCD 22, it is possible to display the virtual object arranged in the virtual space defined by the marker coordinate system as if the virtual object exists, in association with the marker MK in the real world.

Next, the CPU 311 performs a combination process (step 102), and advances the process to the next step. For example, the CPU 311 generates a display image obtained by combining the real world image with the virtual space image, and displays the display image on the upper LCD 22.

Figure 20:
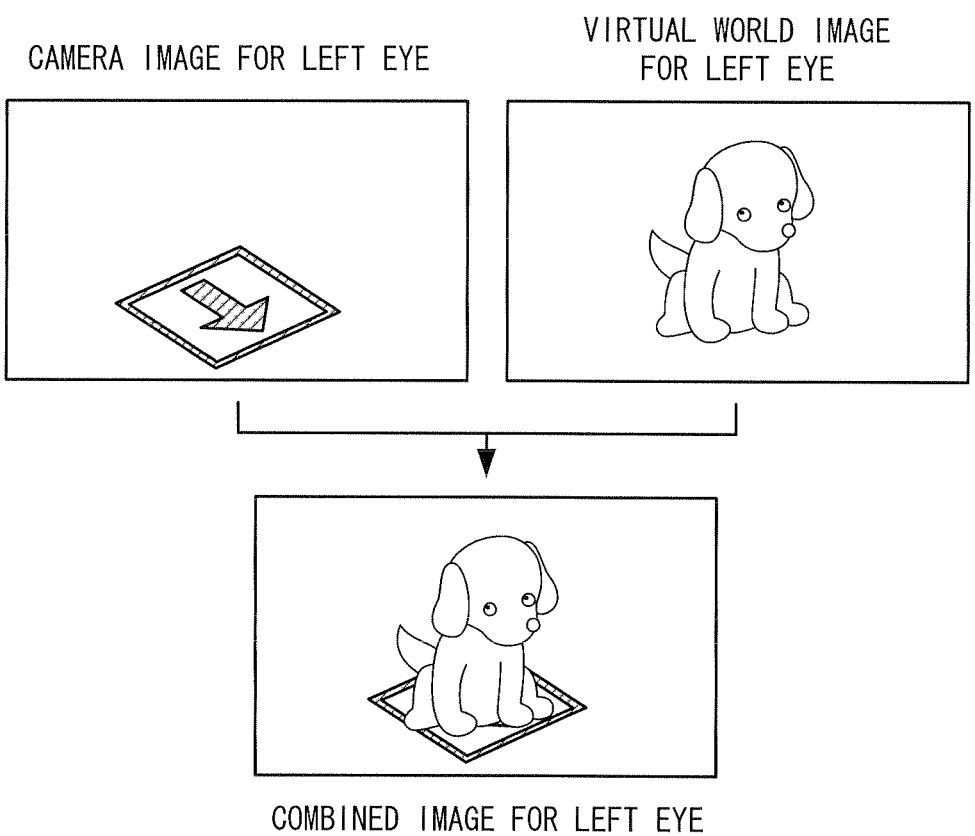
FIG. 20 shows an example of a manner of generating an image for a left eye.

Specifically, the CPU 311 renders the camera image for a left eye represented by the left camera image data Da in a predetermined storage area in the VRAM 313 (hereinafter referred to as left frame buffer), in which an image for a left eye to be supplied to the upper LCD 22 is temporarily stored. Then, the CPU 311 overwrites the virtual world image for a left eye represented by the left virtual world image data Dp (that is, the image of the virtual space seen from the left virtual camera) in the left frame buffer (typically, the GPU 312 performs the rendering in accordance with an instruction from the CPU 311). Accordingly, as shown in FIG. 20, the virtual world image for a left eye is combined with the camera image for a left eye rendered in the left frame buffer (left real world image). The image rendered in the left frame buffer is supplied to the upper LCD 22 as an image for a left eye at a predetermined timing, to be displayed on the upper LCD 22. In the virtual world image for a left eye, the background of the virtual space is transparent, and therefore, by combining the virtual world image for a left eye with the left real world image, an image as if the virtual character C exists in the real world image is generated.

Meanwhile, the CPU 311 renders the camera image for a right eye represented by the right camera image data Db in a predetermined storage area in the VRAM 313 (hereinafter referred to as right frame buffer), in which an image for a right eye to be supplied to the upper LCD 22 is temporarily stored. Then, the CPU 311 overwrites the virtual world image for a right eye represented by the right virtual world image data Dq (that is, the image of the virtual space seen from the right virtual camera) in the right frame buffer. Accordingly, the virtual world image for a right eye is combined with the camera image for a right eye rendered in the right frame buffer (right real world image). The image rendered in the right frame buffer is supplied to the upper LCD 22 as an image for a right eye at a predetermined timing, to be displayed on the upper LCD 22. Also in the virtual world image for a right eye, the background of the virtual space is transparent, and therefore, by combining the virtual world image for a right eye with the right real world image, an image as if the virtual character C exists in the real world image is generated.

Next, the CPU 311 sets all the sound recognition flags to OFF (step 103), and ends the processes of the sub-routine. For example, the CPU 311 sets all the sound recognition flags (clapping flag, whistle flag, breath flag, and registered sound flag) to OFF, respectively, thereby updating the clapping flag data Dk, whistle flag data Dl, breath flag data Dm and registered sound flag data Dn.

With reference back to FIG. 14, after the image combining process in step 55, the CPU 311 determines whether the current time point is a photographing timing (step 56). As an example, when the operation input stored in the operation input data Dd represents a photographing operation, the CPU 311 determines that the current time point is the photographing timing. As another example, when the CPU 311 has obtained in step 52 operation input data representing a self-timer operation, which is an automatic photographing performed after a certain period of time elapses, and when the certain period of time has elapsed, the CPU 311 determines that the current time point is the photographing timing. When the current time point is a photographing timing, the CPU 311 advances the process to the next step 57. On the other hand, when the current time point is not a photographing timing, the CPU 311 advances the process to the next step 58. It should be noted that the photographing operation to be determined in step 56 may be performed by means of a sound inputted by the user. In this case, the CPU 311 determines whether a photographing instruction has been given by the user through sound recognition of the sound waveform represented by the sound waveform data Dc.

In step 57, the CPU 311 saves the image obtained by the combination process in step 102, and advances the process to the next step 58. For example, the CPU 311 stores in the internal data storage memory 35 or the external data storage memory 46 the combined image data representing the image for a left eye and the image data representing the image for a right eye, which have been obtained in the combination process in step 102.

In step 58, the CPU 311 determines whether the image processing is to be ended. The image processing is ended, for example, when a condition for automatically ending the image processing is satisfied, when a condition for the game currently performing image processing to be over has been satisfied, when the user has performed an operation for ending the image processing, or the like. If not ending the image processing, the CPU 311 causes the process back to step 52, and repeats the processes. On the other hand, when ending the image processing, the CPU 311 ends the processes of the flow chart.

As described above, in the image processing according to the embodiment, when the virtual character C is additionally displayed in the camera image, it is possible to perform operations onto the virtual character C by means of a sound, and thus, possible to perform operations onto the virtual object additionally displayed in the real world image, by using a new input method.

In the above description, the marker MK arranged in the real world is used as the imaging subject whose image is to be taken. When an image of the marker MK is taken and the marker MK is displayed as a marker image MKi, the virtual character C is additionally displayed on or near the marker image MKi. For realizing this, the marker MK is used in order to recognize the relative positional relationship between the real world and the imaging apparatus (outer imaging section 23) as well as the orientation of the imaging apparatus, and to set a position at which the virtual object, a letter, or the like is to be additionally displayed in accordance with the result of the recognition. However, the present invention can be realized without using the marker MK.

For example, the relative positional relationship between the real world and the imaging apparatus can be processed in a similar manner to the image processing described above if a characteristic point (e.g., an edge or contour of the subject) in an image taken by the imaging apparatus is recognized, if a characteristic in the taken image for detecting a horizontal plane or the like in the taken image is detected, and if the position and orientation of the imaging apparatus in the real world is obtained by using GPS or sensors. Specifically, by using an algorithm or the like used for extracting a characteristic point in the taken image and its characteristic amount (for example, SIFT (Scale-invariant feature transform)), it is possible to detect a characteristic in the taken image without using the marker MK.

For example, as shown in FIG. 21, the present invention can be applied to a case where while a real time image being taken by an imaging apparatus is being displayed on a display device, information (e.g., letter information or icons) related to the location or the subject (buildings, signboards, and the like) whose image is being taken by the imaging apparatus is superimposed as additional information, and displayed on the taken image. This display technique identifies the current position by using GPS incorporated in the imaging apparatus (game apparatus 10) and recognizes the imaging direction by means of a magnetic sensor (electronic compass, or the like) which is also incorporated in the imaging apparatus. Then, additional information corresponding to the identified position and imaging direction is superimposed on the taken image to be displayed. In this case, image recognition of the taken image is not necessary. However, in another method, artificial landmarks are widely arranged and the positions of the landmarks extracted through image recognition of the taken image are additionally used to estimate the position and the orientation of the imaging apparatus. Further, in still another method, the position and the orientation of a camera which has taken an image is estimated by associating a two-dimensional characteristic point (edge, contour, or the like) on the taken image with a three-dimensional position of a natural characteristic point.

As described above, it is possible to obtain the position and the orientation of the imaging apparatus in the real world without using the marker MK. If these techniques are used, the present invention can be realized without using the marker MK. For example, with reference to FIG. 21, an image of four buildings (A department store, B building, C building, and D bank) is taken as a subject by the outer imaging section 23, and the taken image is being displayed on the upper LCD 22. On each of the four buildings being displayed, letter information indicating the name of the corresponding building is superimposed as additional information. If one piece of the additional information is selected, further detailed information of the selected building can be displayed. In such a case, by selecting one piece of the additional information by means of a sound, the present invention can display such further detailed information of the building selected by means of the sound. Specifically, in a case where the user inputs a sound (words) of "A department store", which is a speech sound, into the game apparatus 10, the game apparatus 10 performs sound recognition with respect to "A department store", which has been inputted as a sound, and changes the display form of the letter information (additional information) selected in accordance with the sound recognition result. For example, by changing the display form of the color, font, letter size, letter thickness, letter decoration, letter display position, and the like of the letter information selected by means of the sound input, and thereby distinctively displaying the selected letter information from the other pieces of letter information, it is possible to notify the user of the selected letter information. Then, the game apparatus 10 displays on the upper LCD 22 further detailed information regarding the subject to which the selected letter information has been added. In this manner, also in a case where letters are additionally displayed as a virtual object while the position and the orientation of the imaging apparatus in the real world is being obtained without using the marker MK, it is possible to perform the operation of selecting the letters through a sound input. In the conventional input methods, it is an onerous operation to select, while an image of the real world image is being taken, a target from among a plurality of choices superimposed on the real world image. However, with the present invention, the operability is greatly improved by selecting a target through a sound input which does not require the fingers of the user holding the imaging apparatus (game apparatus 10).

In the above, description has been given of an exemplary case where an image which is stereoscopically visible by naked eyes (stereoscopic image) is displayed on the upper LCD 22. However, a planar image (a planarly visible image which is different from the above described stereoscopically visible image) of the real world obtained from either one of the outer imaging section 23 and the inner imaging section 24 may be displayed on the upper LCD 22.

In the embodiment above where the upper LCD 22 is a liquid crystal display device of a parallax barrier type, it is possible to switch the stereoscopic display mode to the planar display mode and vice versa by controlling ON/OFF of the parallax barrier. In another embodiment, for example, a stereoscopic image and a planar image may be displayed by using a liquid crystal display device of a lenticular lens type as the upper LCD 22. Also in the case of the lenticular lens type display device, by dividing each of two images taken by the outer imaging section 23 into rectangle-shaped images in the vertical direction and alternately aligning the rectangle-shaped images, the images are stereoscopically displayed. Even in the case of the lenticular lens type display device, by causing the left and right eyes of the user to view one image taken by the inner imaging section 24, it is possible to display the image in a planar manner. That is, even with a liquid crystal display device of a lenticular lens type, it is possible to cause the left and right eyes of the user to view the same image by dividing the same image into rectangle-shaped images in the vertical direction and alternately aligning the rectangle-shaped images. Accordingly, it is possible to display the image taken by the inner imaging section 24 as a planar image.

In the above, description has been given of an exemplary case where the upper LCD 22 is a display device capable of displaying an image which is stereoscopically visible by naked eyes. However, the upper LCD 22 may be configured by using another method in such a manner as to display an image in a stereoscopically visible manner. For example, the upper LCD 22 may be configured such that it can display an image in a stereoscopically visible manner by using polarizing filter method, time sharing system, anaglyph method, or the like.

In the embodiment, description has been given of a case where the lower LCD 12 and the upper LCD 22, which are physically separated components and vertically aligned, are used as an example of the liquid crystal display corresponding to two screens (the two screens are vertically aligned). However, the present invention can be realized by an apparatus including a single display screen (e.g., the upper LCD 22 only) or an apparatus which performs image processing onto an image to be displayed on a single display device. Alternatively, the configuration of the display screen corresponding to two screens may be realized by another configuration. For example, the lower LCD 12 and the upper LCD 22 may be arranged on one main surface of the lower housing 11, such that they are arranged side by side in the horizontal direction. Still alternatively, one vertically long LCD which has the same horizontal dimension as that of the lower LCD 12 and has a longitudinal dimension twice of that of the lower LCD 12 (that is, physically one LCD having a display area corresponding to two screens which are vertically arranged) may be provided on one main surface of the lower housing 11, and two images (e.g., an taken image, an image of a screen indicating operational descriptions, and the like) mat be vertically displayed (that is, the two images are displayed vertically side by side without the border portion therebetween). Still alternatively, one horizontally long LCD which has the same longitudinal dimension as that of the lower LCD 12 and has a horizontal dimension twice of that of the lower LCD 12 mat be provided on one main surface of the lower housing 11, and two images mat be horizontally displayed (that is, the two images are displayed horizontally side by side without the border portion therebetween). That is, by dividing one screen into two display portions, two images may be displayed on the display portions, respectively. Still alternatively, when the two images are displayed on the two display portions provided on the physically one screen, the touch panel 13 may be provided in such a manner as to cover the entire screen.

In the embodiment described above, the touch panel 13 is provided integrally with the game apparatus 10. However, it will be understood that the present invention can be realized even when the touch panel is provided separately from the game apparatus. Still alternatively, the touch panel 13 may be provided on the surface of the upper LCD 22, and the display image displayed on the lower LCD 12 may be displayed on the upper LCD 22, and the display image displayed on the upper LCD 22 may be displayed on the lower LCD 12. Still alternatively, the touch panel 13 may not be provided when realizing the present invention.

The embodiment has been described by using the hand-held game apparatus 10. However, the image processing program of the present invention may be executed by using an information processing apparatus such as a stationary game apparatus or a general personal computer, to realize the present invention. In another embodiment, instead of the game apparatus, any hand-held electronic device, such as PDA (Personal Digital Assistant) or a mobile telephone, a personal computer, a camera, or the like may be used.

In the above, description has been given of an exemplary case where the image processing is performed by the game apparatus 10. However, at least a part of the process steps in the image processing may be performed by other apparatuses. For example, when the game apparatus 10 is allowed to communicate with another apparatus (for example, server or another game apparatus), the process steps in the image processing may be performed by the game apparatus 10 in combination with the other apparatus. As an example, another apparatus may perform the process of setting the real world image and the virtual character C, and the game apparatus 10 may obtain data regarding the real world image and the virtual character C and perform the processes of step 54 to step 68. In this manner, also when at least a part of the process steps in the above image processing is performed by another apparatus, the processing similar to the above described image processing can be performed. The above described image processing can be performed by one processor or by a cooperation of a plurality of processors included in an information processing system formed by at least one information processing apparatus. In the above embodiment, the processes in the above flow charts are performed by the information processing section 31 of the game apparatus 10 performing a predetermined program. However, a part or the whole of the above processes may be performed by a dedicated circuit included in the game apparatus 10.

In addition, the shape of the game apparatus 10 is only an example. The shapes and the number of the various operation buttons 14, the analog stick 15, and the touch panel 13 are examples only, and the positions at which the various operation buttons 14, the analog stick 15, and the touch panel 13 are mounted, respectively, are also examples only. It will be understood that other shapes, other number, or other positions may be used for realizing the present invention. The order of the process steps, the setting values, the values used for determinations, and the like which are used in the image processing described above are only examples. It will be understood that other order of process steps and other values may be used for realizing the present invention.

Furthermore, the image processing program (game program) may be supplied to the game apparatus 10 not only via an external storage medium such as the external memory 45 or the external data storage memory 46, but also via a wired or wireless communication line. Furthermore, the program may be stored in advance in a nonvolatile storage unit in the game apparatus 10. The information storage medium for storing the program may be a CD-ROM, a DVD, a like optical disc-shaped storage medium, a flexible disc, a hard disk, a magneto-optical disc, or a magnetic tape, other than a nonvolatile memory. The information storage medium for storing the above program may be a volatile memory for storing the program.

While the invention has been described in detail, the foregoing description is in all aspects illustrative and not restrictive. It should be understood that numerous other modifications and variations can be devised without departing from the scope of the invention. It should be understood that the scope of the present invention is interpreted only by the scope of the claims. It also should be understood that, from the description of specific embodiments of the present invention, the one skilled in the art can easily implement the present invention in the equivalent range based on the description of the present invention and on the common technological knowledge. Further, it should be understood that terms used in the present specification have meanings generally used in the art concerned unless otherwise specified. Therefore, unless otherwise defined, all the jargons and technical terms have the same meanings as those generally understood by one skilled in the art of the present invention. In the event of any confliction, the present specification (including meanings defined herein) has priority.

The storage medium having stored therein the image processing program, the image processing apparatus, the image processing system, and the image processing method according to the present invention allow the user, when displaying an image obtained by combining a real world image with a virtual world image, to perform operations by using a new input method onto the virtual object, letter, or the like which is additionally being displayed on the real world image, and are useful as an image processing program, an image processing apparatus, an image processing system, an image processing method, and the like, respectively, which perform processing of displaying images on a display device.

What is claimed is:

1. A non-transitory computer-readable storage medium having stored therein an image processing program executed by a computer of an image processing apparatus for displaying an image on a display device, the image processing program causing the computer to perform functionality comprising:

obtaining an image taken by a real camera;
   calculating position and orientation information determined in accordance with a position and an orientation of the real camera in a real space;
   obtaining sound data representing a sound signal from a sound input device;
   recognizing a sound inputted into the sound input device;
   setting, based on the taken image, a virtual object to be additionally displayed on the taken image and setting, based on a sound recognition result, a display animation of the virtual object;
   setting, when the sound inputted into the sound input device is recognized as a first sound and the position and orientation information satisfies a first condition, at least one selected from the group consisting of the display position, the orientation, and the display form of the virtual object based on a first action, and setting, when the sound inputted into the sound input device is recognized as the first sound and the position and orientation information does not satisfy the first condition, at least one selected from the group consisting of the display position, the orientation, and the display form of the virtual object based on a second action;

setting in a virtual world a position and an orientation of a virtual camera based on the position and orientation information;

arranging the virtual object set in the virtual world;

generating as a virtual world image an image in the virtual world seen from the virtual camera;

generating as a combined image an image obtained by superimposing the virtual world image, including the virtual object, on the taken image; and causing the display device to display the combined image.

2. The non-transitory computer-readable storage medium having stored therein the image processing program according to claim 1, wherein the image processing program further causing the computer to perform functionality comprising:

detecting one of a certain imaging target and a certain characteristic point included in the taken image and calculating, based on a result of the detection, information representing a relative position and a relative orientation between the real camera and the one of the imaging target and the characteristic point, as the position and orientation information.

3. The non-transitory computer-readable storage medium having stored therein the image processing program according to claim 2, wherein the image processing program further causing the computer to perform functionality comprising:

calculating, as the position and orientation information, information representing a relative position and a relative orientation between the imaging target and the real camera;

setting in a virtual world a position and a direction corresponding to the imaging target, based on the position and orientation information, and setting in the virtual world a position and an orientation of the virtual camera, with reference to the position and the direction corresponding to the imaging target, based on the position and orientation information;

arranging the virtual object set in the virtual world, with reference to the position corresponding to the imaging target; and setting, when the sound inputted into the sound input device is recognized as a first sound, at least one selected from the group consisting of the display position, the orientation, and the display form of the virtual object, based on a first action to be performed with reference to the direction corresponding to the imaging target in the virtual world, and setting, when the sound inputted into the sound input device is recognized as a second sound, at least one selected from the group consisting of the display position, the orientation, and the display form of the virtual object, based on a second action to be performed with reference to the direction to the virtual camera in the virtual world.

4. The non-transitory computer-readable storage medium having stored therein the image processing program according to claim 1, wherein the image processing program further causing the computer to perform functionality comprising calculating the position and orientation information by using at least one of a geographic position of the real camera and an azimuth of an imaging direction of the real camera in the real space.

5. The non-transitory computer-readable storage medium having stored therein the image processing program according to claim 1, wherein the image processing program further causing the computer to perform functionality comprising setting, at one of a case where the sound is not inputted into the sound input device and a case where the sound recognized is not a sound that causes the virtual object to be set, the display animation of the virtual object, to a predetermined content.

6. The non-transitory computer-readable storage medium having stored therein the image processing program according to claim 1, wherein the image processing program further causing the computer to perform functionality comprising saving in a storage device a latest combined image currently generated in accordance with a photographing instruction given by a user.

7. The non-transitory computer-readable storage medium having stored therein the image processing program according to claim 1, wherein the image processing program further causing the computer to perform functionality comprising:

obtaining a first image taken by a first real camera and a second image taken by a second real camera which is provided at a position spaced from the first real camera by a predetermined distance, calculating first position and orientation information determined in accordance with a position and an orientation of the first real camera in the real space and second position and orientation information determined in accordance with a position and an orientation of the second real camera in the real space, generating a first combined image by superimposing, with reference to a position in the first taken image in accordance with the first position and orientation information, the set virtual object, and generating a second combined image by superimposing, with reference to a position in the second taken image in accordance with the second position and orientation information, the set virtual object, and outputting the first combined image and the second combined image to a display device capable of displaying a stereoscopically visible image, and causing the display device to stereoscopically display the output first and second combined images including the virtual object.

8. The non-transitory computer-readable storage medium having stored therein the image processing program according to claim 1, wherein the image processing program further causing the computer to perform functionality comprising determining whether the sound inputted into the sound input device is a first sound at least by verifying the sound inputted into the sound input device against a sound registered in advance as a registered sound, and determining whether the sound inputted into the sound input device is a second sound based only on the level of a sound waveform of the sound inputted into the sound input device.

9. The non-transitory computer-readable storage medium having stored therein the image processing program according to claim 8, wherein the image processing program further causing the computer to perform functionality comprising:

allowing a user to input a sound corresponding to an instruction to be given to the virtual object, and registering, in a storage device, sound data corresponding to the sound as the registered sound corresponding to the instruction;

determining whether the sound inputted into the sound input device is the first sound by using the sound data registered as the registered sound; and setting, when the sound inputted into the sound input device is recognized as the first sound, the display animation of the virtual object based on the instruction corresponding to the first sound and registered in advance.

10. The non-transitory computer-readable storage medium having stored therein the image processing program according to claim 1, wherein the image processing program further causing the computer to perform functionality comprising:

determining whether the sound inputted into the sound input device is a first sound, based on the likelihood of a feature parameter time series registered in advance as a registered sound against a feature parameter time series obtained from the sound input pattern inputted into the sound input device, and determining whether the sound inputted into the sound input device is a third sound, based only on at least one of the level of a sound waveform and spectrum information of the sound inputted into the sound input device.

11. The non-transitory computer-readable storage medium having stored therein the image processing program according to claim 1, wherein the image processing program further causing the computer to perform functionality comprising:

obtaining the taken image from the real camera incorporated in a housing which incorporates the image processing apparatus, obtaining the sound data from the sound input device incorporated in the housing, and causing the display device incorporated in the housing to display the combined image.

12. The non-transitory computer-readable storage medium having stored therein the image processing program according to claim 1, wherein the display position is selected from the group as being set based on the sound recognition result.

13. The non-transitory computer-readable storage medium having stored therein the image processing program according to claim 1, wherein the orientation is selected from the group as being set based on the sound recognition result.

14. The non-transitory computer-readable storage medium having stored therein the image processing program according to claim 1, wherein the image processing program further causing the computer to perform functionality comprising detecting one of a certain imaging target and a certain characteristic point from the taken image, and setting the virtual object based on the detected imaging target or characteristic point.

15. The non-transitory computer-readable storage medium having stored therein the image processing program according to claim 1, wherein the image processing program further causing the computer to perform functionality comprising determining, when a direction of a certain imaging target included in the taken image is within a predetermined range in the image recognition result of the taken image, that the image recognition result satisfies the first condition.

16. The non-transitory computer-readable storage medium having stored therein the image processing program according to claim 1, wherein the image processing program further causing the computer to perform functionality comprising detecting one of a certain imaging target and a certain characteristic point from the taken image in the image recognition, and setting an action of the virtual object based on the detected imaging target or characteristic point.

17. An image processing apparatus for displaying an image on a display device, comprising at least one processor, the image processing apparatus configured to:

obtain an image taken by a real camera;

calculate position and orientation information determined in accordance with a position and an orientation of the real camera in a real space, obtain sound data representing a sound signal from a sound input device;

recognize a sound inputted into the sound input device;

set, based on the taken image, a virtual object to be additionally displayed on the taken image, and set, based on a sound recognition result, a display animation of the virtual object;

set, when the sound inputted into the sound input device is recognized as a first sound and the position and orientation information satisfies a first condition, at least one selected from the group consisting of the display position, the orientation, and the display form of the virtual object based on a first action, and set, when the sound inputted into the sound input device is recognized as the first sound and the position and orientation information does not satisfy the first condition, at least one selected from the group consisting of the display position, the orientation, and the display form of the virtual object based on a second action;

set in a virtual world a position and an orientation of a virtual camera based on the position and orientation information;

arrange the virtual object set in the virtual world;

generate as a virtual world image an image in the virtual world seen from the virtual camera;

generate as a combined image an image obtained by superimposing the virtual world image, including the virtual object, on the taken image; and cause the display device to display the combined image.

18. The image processing apparatus according to claim 17, wherein the image processing apparatus incorporates the real camera, the display device, and the sound input device in at least one housing which incorporates the image processing apparatus.

19. An image processing system which includes a plurality of apparatuses communicable with each other, and which displays an image on a display device, the image processing system comprising:

a processing system having at least one processor, the processing system configured to:

obtain an image taken by a real camera, calculate position and orientation information determined in accordance with a position and an orientation of the real camera in a real space, obtain sound data representing a sound signal from a sound input device, recognize a sound inputted into the sound input device, set, based on the taken image, a virtual object to be additionally displayed on the taken image, and set, based on a sound recognition result, a display animation of the virtual object, set, when the sound inputted into the sound input device is recognized as a first sound and the position and orientation information satisfies a first condition, at least one selected from the group consisting of the display position, the orientation, and the display form of the virtual object based on a first action, and set, when the sound inputted into the sound input device is recognized as the first sound and the position and orientation information does not satisfy the first condition, at least one selected from the group consisting of the display position, the orientation, and the display form of the virtual object based on a second action,
set in a virtual world a position and an orientation of a virtual camera based on the position and orientation information;
arrange the virtual object set in the virtual world;
generate as a virtual world image an image in the virtual world seen from the virtual camera;
generate as a combined image an image obtained by superimposing the virtual world image, including the virtual object, on the taken image; and
cause the display device to display the combined image.

20. A non-transitory computer-readable storage medium having stored therein an image processing program executed by a computer of an image processing apparatus for displaying an image on a display device, the image processing program causing the computer to perform functionality comprising:
repeatedly obtaining an image taken by a real camera;
repeatedly calculating position and orientation information determined in accordance with a position and an orientation of the real camera in real space;
obtaining sound data representing a sound signal from a sound input device;
recognizing a sound inputted into the sound input device;
setting a virtual object to be additionally displayed on the taken image;
setting, when the sound inputted into the sound input device is recognized as a first sound and the position and orientation information satisfies a first condition, at least one selected from the group consisting of the display position, the orientation, and the display form of the virtual object based on a first action, and setting, when the sound inputted into the sound input device is not recognized as the first sound and the position and orientation information satisfies the first condition, at least one selected from the group consisting of the display position, the orientation, and the display form of the virtual object based on a second action;
repeatedly generating a combined image by, based on a position included in the taken image and corresponding to the position and orientation information, superimposing the set virtual object;
setting in a virtual world a position and an orientation of a virtual camera based on the position and orientation information;
arranging the virtual object set in the virtual world;
generating as a virtual world image an image in the virtual world seen from the virtual camera; and
repeatedly causing the display device to display the combined image.

21. The non-transitory computer-readable storage medium having stored therein the image processing program according to claim 20, wherein the image processing program further causing the computer to perform functionality comprising detecting one of a certain imaging target and a certain characteristic point from the taken image in the image recognition, and setting an action of the virtual object based on the detected imaging target or characteristic point.

22. An image processing apparatus for displaying an image on a display device, comprising at least one processor, the image processing apparatus configured to:
repeatedly obtain an image taken by a real camera;
repeatedly calculate position and orientation information determined in accordance with a position and an orientation of the real camera in real space;
obtain sound data representing a sound signal from a sound input device;
recognize a sound inputted into the sound input device;
set a virtual object to be additionally displayed on the taken image;
set, when the sound inputted into the sound input device is recognized as a first sound and the position and orientation information satisfies a first condition, at least one selected from the group consisting of the display position, the orientation, and the display form of the virtual object based on a first action, and set, when the sound inputted into the sound input device is not recognized as the first sound and the position and orientation information satisfies the first condition, at least one selected from the group consisting of the display position, the orientation, and the display form of the virtual object based on a second action;
repeatedly generate a combined image by, based on a position included in the taken image and corresponding to the position and orientation information, superimposing the set virtual object;
set in a virtual world a position and an orientation of a virtual camera based on the position and orientation information;
arrange the virtual object set in the virtual world;
generate as a virtual world image an image in the virtual world seen from the virtual camera; and
repeatedly cause the display device to display the combined image.

23. An image processing system which includes a plurality of apparatuses communicable with each other, and which displays an image on a display device, the image processing system comprising:
a processing system having at least one processor, the processing system configured to:
repeatedly obtain an image taken by a real camera,
repeatedly calculate position and orientation information determined in accordance with a position and an orientation of the real camera in real space,
obtain sound data representing a sound signal from a sound input device,
recognize a sound inputted into the sound input device,
set a virtual object to be additionally displayed on the taken image,
set, when the sound inputted into the sound input device is recognized as a first sound and the position and orientation information satisfies a first condition, at least one selected from the group consisting of the display position, the orientation, and the display form of the virtual object based on a first action, and set, when the sound inputted into the sound input device is not recognized as the first sound and the position and orientation information satisfies the first condition, at least one selected from the group consisting of the display position, the orientation, and the display form of the virtual object based on a second action,
repeatedly generate a combined image by, based on a position included in the taken image and corresponding to the position and orientation information, superimposing the set virtual object,
set in a virtual world a position and an orientation of a virtual camera based on the position and orientation information,
arrange the virtual object set in the virtual world, generate as a virtual world image an image in the virtual world seen from the virtual camera, and repeatedly cause the display device to display the combined image.

24. A non-transitory computer-readable storage medium having stored therein an image processing program executed by a computer of an image processing apparatus for displaying an image on a display device, the image processing program causing the computer to perform functionality comprising:

obtaining an image taken by a real camera;

calculating position and orientation information determined in accordance with a position and an orientation of the real camera in a real space by using at least one of a geographic position of the real camera and an azimuth of an imaging direction of the real camera in the real space;

obtaining sound data representing a sound signal from a sound input device;

recognizing a sound inputted into the sound input device;

setting, based on the taken image, a letter to be additionally displayed on the taken image, and setting, based on a sound recognition result, a display animation of the letter;

estimating a subject whose image has been taken in the taken image, based on at least one of the geographic position of the real camera and the azimuth of the imaging direction of the real camera represented by the position and orientation information, the letter representing information about the subject;

changing, when the letter coincides with a word recognized through sound recognition, a display form into that indicating that the letter has been selected, and setting the letter;

generating a combined image by superimposing, with reference to the position in the taken image in accordance with the position and orientation information, the letter corresponding to the subject and which coincides with the word in the updated display form; and causing the display device to display the combined image, wherein in setting the display animation at least one selected from a group consisting of a display position, an orientation, and a display form of the letter is set.

25. An image processing apparatus for displaying an image on a display device, comprising at least one processor, the image processing apparatus configured to:

obtain an image taken by a real camera;

calculate position and orientation information determined in accordance with a position and an orientation of the real camera in a real space by using at least one of a geographic position of the real camera and an azimuth of an imaging direction of the real camera in the real space;

obtain sound data representing a sound signal from a sound input device;

recognize a sound inputted into the sound input device;

set, based on the taken image, a letter to be additionally displayed on the taken image, and set, based on a sound recognition result, a display animation of the letter;

estimate a subject whose image has been taken in the taken image, based on at least one of the geographic position of the real camera and the azimuth of the imaging direction of the real camera represented by the position and orientation information, the letter representing information about the subject;

change, when the letter coincides with a word recognized through sound recognition, a display form into that indicating that the letter has been selected;

generate a combined image by superimposing, with reference to the position in the taken image in accordance with the position and orientation information, the letter corresponding to the subject and which coincides with the word in the updated display form; and cause the display device to display the combined image, wherein in setting the display animation at least one selected from a group consisting of a display position, an orientation, and a display form of the letter is set.

26. An image processing system which includes a plurality of apparatuses communicable with each other, and which displays an image on a display device, the image processing system comprising:

a processing system having at least one processor, the processing system configured to:

obtain an image taken by a real camera, calculate position and orientation information determined in accordance with a position and an orientation of the real camera in a real space by using at least one of a geographic position of the real camera and an azimuth of an imaging direction of the real camera in the real space, obtain sound data representing a sound signal from a sound input device, recognize a sound inputted into the sound input device, set, based on the taken image, a letter to be additionally displayed on the taken image, and set, based on a sound recognition result, a display animation of the letter, estimate a subject whose image has been taken in the taken image, based on at least one of the geographic position of the real camera and the azimuth of the imaging direction of the real camera represented by the position and orientation information, the letter representing information about the subject, change, when the letter coincides with a word recognized through sound recognition, a display form into that indicating that the letter has been selected, generate a combined image by superimposing, with reference to the position in the taken image in accordance with the position and orientation information, the letter corresponding to the subject and which coincides with the word in the updated display form, and cause the display device to display the combined image, wherein in setting the display animation at least one selected from a group consisting of a display position, an orientation, and a display form of the letter is set.

* * * * *